United States Patent
Ji et al.

(10) Patent No.: US 11,463,132 B2
(45) Date of Patent: Oct. 4, 2022

(54) DATA TRANSMISSION USING A QUASI CO-LOCATION TYPE ASSOCIATED WITH A TYPE OF CHANNEL LARGE-SCALE CHARACTERISTIC PARAMETER

(71) Applicant: Huawei Technologies Co., Ltd., Shenzhen (CN)

(72) Inventors: Liuliu Ji, Shanghai (CN); Yi Huang, Shanghai (CN); Haibao Ren, Shanghai (CN); Yuanjie Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/401,802

(22) Filed: May 2, 2019

(65) Prior Publication Data

US 2019/0260425 A1 Aug. 22, 2019

Related U.S. Application Data

(63) Continuation of application No. PCT/CN2017/109561, filed on Nov. 6, 2017.

(30) Foreign Application Priority Data

Nov. 4, 2016 (CN) .......................... 201610978476.1
Aug. 11, 2017 (CN) .......................... 201710687305.8

(51) Int. Cl.
*H04B 7/024* (2017.01)
*H04W 24/02* (2009.01)
(Continued)

(52) U.S. Cl.
CPC .............. *H04B 7/024* (2013.01); *H04L 1/00* (2013.01); *H04L 5/0053* (2013.01);
(Continued)

(58) Field of Classification Search
CPC ........ H04B 7/024; H04B 1/74; H04B 7/0695; H04B 7/088; H04B 7/027; H04L 1/00;
(Continued)

(56) References Cited

U.S. PATENT DOCUMENTS 9,603,139 B2 * 3/2017 Lee ..................... H04W 72/042
9,936,411 B2 * 4/2018 Kim ...................... H04W 24/10
(Continued)

FOREIGN PATENT DOCUMENTS

CN 103874207 A 6/2014
CN 103944668 A 7/2014
(Continued)

OTHER PUBLICATIONS

"Discussion on beam coordination and QCL for NR," 3GPP TSG RAN WG1 Meeting #86bis, Lisbon, Portugal, R1-1609256, XP051149302, pp. 1-6, 3rd Generation Partnership Project, Valbonne, France (Oct. 10-14, 2016).

(Continued)

*Primary Examiner* — Thomas R Cairns
(74) *Attorney, Agent, or Firm* — Leydig, Voit & Mayer, Ltd.

(57) ABSTRACT

A method relating to quasi co-location functionality for wireless communication includes: a radio access network device sending signaling to a terminal device, where the signaling includes a quasi co-location type and at least one set of configuration parameters associated with the quasi co-location type, and the terminal device applying one set of configuration parameters associated with the first quasi co-location type, to learn of at least two quasi co-located antenna ports effective when at least one channel large-scale characteristic parameter associated with the first quasi co-location type is applied.

24 Claims, 5 Drawing Sheets

300

(51) Int. Cl.
*H04L 1/00* (2006.01)
*H04W 24/04* (2009.01)
*H04L 5/00* (2006.01)
*H04W 84/04* (2009.01)

(52) U.S. Cl.
CPC ........... *H04L 5/0091* (2013.01); *H04W 24/02* (2013.01); *H04W 24/04* (2013.01); *H04W 84/042* (2013.01)

(58) Field of Classification Search
CPC ... H04L 5/0053; H04L 5/0091; H04L 1/0027; H04L 5/0048; H04L 5/0055–0057; H04L 5/0092–0098; H04L 7/00; H04L 41/0654; H04L 41/0823; H04W 24/02; H04W 24/04; H04W 84/042; H04W 8/30; H04W 16/18; H04W 16/26; H04W 36/0083; H04W 72/042; H04W 84/045–047; H04W 84/22; H04W 88/04; H04W 88/18
See application file for complete search history.

(56) References Cited

U.S. PATENT DOCUMENTS

| | | | |
|---|---|---|---|
| 10,637,550 | B2* | 4/2020 | Park .................. H04B 17/24 |
| 10,812,162 | B2* | 10/2020 | Nam .................. H04W 72/042 |
| 2014/0126490 | A1 | 5/2014 | Chen et al. |
| 2015/0078191 | A1 | 3/2015 | Jöngren et al. |
| 2015/0257130 | A1 | 9/2015 | Lee et al. |
| 2015/0358848 | A1 | 12/2015 | Kim et al. |
| 2016/0006547 | A1 | 1/2016 | Kang et al. |
| 2016/0088512 | A1 | 3/2016 | Bergström et al. |
| 2016/0142189 | A1 | 5/2016 | Shin et al. |
| 2017/0180016 | A1 | 6/2017 | Park et al. |
| 2019/0045488 | A1* | 2/2019 | Park .................. H04L 5/0048 |
| 2019/0296868 | A1* | 9/2019 | Zhang .................. H04L 5/0048 |

FOREIGN PATENT DOCUMENTS

| | | |
|---|---|---|
| CN | 104106223 A | 10/2014 |
| CN | 104662818 A | 5/2015 |
| CN | 104753633 A | 7/2015 |
| CN | 105144612 A | 12/2015 |
| CN | 105308878 A | 2/2016 |
| CN | 105471559 A | 4/2016 |
| EP | 2654333 A1 | 10/2013 |
| EP | 2950470 A1 | 12/2015 |
| EP | 3487105 A1 | 5/2019 |

OTHER PUBLICATIONS

"On Qusai-Co-Location/Beam for NR MIMO," 3GPP TSG RAN WG1 Meeting #86bis, Lisbon, Portugal, R1-1608675, XP051148733, pp. 1-6, 3rd Generation Partnership Project, Valbonne, France (Oct. 10-14, 2016).

"Evaluation of the Impact of QCL Assumptions and Discussion on Potential QCL Configurations," 3GPP TSG RAN WG1 Meeting #86, Gothenburg, Sweden, R1-167199, XP051140570, pp. 1-8, 3rd Generation Partnership Project, Valbonne, France (Aug. 22-26, 2016).

3GPP TS 36.213 V13.0.1 (Jan. 2016); 3rd Generation Partnership Project; Technical Specification Group Radio Access Network; Evolved Universal Terrestrial Radio Access (E-UTRA); Physical layer procedures (Release 13); 326 pages (2016).

3GPP TS 36.211 V13.2.0 (Jun. 2016); 3rd Generation Partnership Project; Technical Specification Group Radio Access Network; Evolved Universal Terrestrial Radio Access (E-UTRA); Physical channels and modulation (Release 13); 168 pages (2016).

MCC Support, "Final Report of 3GPP TSG RAN WG1 #86 v1.0.0", 3GPP TSG RAN WG1 Meeting #86bis R1-1608562, Lisbon, Portugal, 154 pages, Oct. 10-14, 2016.

Nokia et al., "Extended framework for QCL assumptions", 3GPP TSG-RAN WG1#86bis, R1-1610275, Lisbon, Portugal, 3 pages, Oct. 10-14, 2016.

ZTE Corporation et al., "Way Forward on QCL for NR", 3GPP TSG RAN WG1 Meeting #86-BIS, R1-1610513, Lisbon, Portugal, 2 pages, Oct. 10-14, 2016.

Intel et al., "WF on the QCL for NR", 3GPP TSG RAN WG1 Meeting #86bis R1-1610520, Lisbon, Portugal, 1 page, Oct. 10-14, 2016.

Catt et al., "WF on Beam management", 3GPP TSG RAN WG1 Meeting #86bis, R1-1610539, Lisbon, Portugal, 5 pages, Oct. 10-14, 2016.

Intel Corporation et al., "On QCL to support UE beam management", 3GPP TSG RAN WG1 Meeting #86bis, R1-1609525, Lisbon, Portugal, 4 pages, Oct. 10-14, 2016.

Nokia, et al., "On QCL Configurations in NR", 3GPP TSG-RAN WG1#86bis, R1-1610274, Lisbon, Portugal, 4 pages, Oct. 10-14, 2016.

\* cited by examiner

100

User equipment 101

Network-side device 102

200

DATA TRANSMISSION USING A QUASI CO-LOCATION TYPE ASSOCIATED WITH A TYPE OF CHANNEL LARGE-SCALE CHARACTERISTIC PARAMETER

CROSS-REFERENCE TO RELATED APPLICATIONS

This application is a continuation of International Application No. PCT/CN2017/109561, filed on Nov. 6, 2017, which claims priority to Chinese Patent Application No. 201610978476.1, filed on Nov. 4, 2016 and Chinese Patent Application No. 201710687305.8, filed on Aug. 11, 2017. All of the aforementioned patent applications are hereby incorporated by reference in their entireties.

TECHNICAL FIELD

This application relates to the field of wireless communications technologies, and in particular, to a data transmission method, apparatus, and system in a wireless communications system.

BACKGROUND

Coordinated multipoint (Coordination Multiple Point, CoMP) transmission and reception is a method proposed in Long Term Evolution (LTE) to resolve inter-cell interference and improve cell-edge user throughputs. To support CoMP so that user equipment (UE) can receive a physical downlink control channel (PDCCH) from a serving network device and receive a physical downlink shared channel (PDSCH) from either or both of the serving network device and a cooperating network-side device, the concept of quasi co-location (Quasi-Co-Location, QCL) of antenna ports is introduced in LTE. If two antenna ports are considered as QCL, channel large-scale information of one antenna port can be deduced from channel large-scale information of the other antenna port. On the contrary, if two antenna ports are indicated as non-QCL, the UE cannot assume that channel large-scale information of one antenna port can be deduced from channel large-scale information of the other antenna port.

In a fifth generation (5th Generation, 5G) communications system under discussion, a large-scale antenna array structure with a plurality of panels is configured for a transmit-receive point (TRP). As a result, different antenna panels or different formed beams have different large-scale characteristics. Therefore, more flexible and efficient collaboration between antennas is required, to meet requirements of the 5G New Radio (NR).

SUMMARY

A data transmission method, apparatus, and system in a wireless communications system are described in this specification. Channel large-scale characteristic parameters are classified, based on functions, into different types that correspond to different quasi co-location types, and a plurality of sets of configuration parameters are configured for each quasi co-location type. A plurality of configuration parameters configured for at least two quasi co-location types are notified to a terminal device by using signaling, so that the terminal device learns of at least two types of quasi co-located antenna ports corresponding to different types of channel large-scale characteristic parameters. In this way, quasi co-location configuration in the communications system is more adapted to coordinated transmission and reception in 5G New Radio, providing considerable flexibility.

According to a first aspect, from the perspective of a radio access network side, this application provides a data transmission method for wireless communication, including: sending, by a radio access network device, first signaling to a terminal device, where the first signaling includes a first quasi co-location type, the first quasi co-location type is associated with at least one set of configuration parameters, and the first signaling further includes the at least one set of configuration parameters associated with the first quasi co-location type. The first quasi co-location type is one of at least two preset quasi co-location types, and each of the preset quasi co-location types is associated with at least one channel large-scale characteristic parameter. The first quasi co-location type is associated with a first type of channel large-scale characteristic parameter, and the first type of channel large-scale characteristic parameter includes at least one channel large-scale characteristic parameter. The radio access network device sends the first signaling, so that a first set of configuration parameters in the at least one set of configuration parameters associated with the first quasi co-location type is applied by the terminal device, thereby helping the terminal device learn of at least two quasi co-located antenna ports effective when the at least one channel large-scale characteristic parameter associated with the first quasi co-location type is applied.

In a possible design, optionally, after the radio access network device sends the first signaling to the terminal device, the radio access network device sends second signaling to the terminal device, where the second signaling includes a second quasi co-location type, the second quasi co-location type is associated with at least one set of configuration parameters, and the second signaling further includes the at least one set of configuration parameters associated with the second quasi co-location type. The second quasi co-location type is one of the at least two preset quasi co-location types, the second quasi co-location type is associated with a second type of channel large-scale characteristic parameter, and the second type of channel large-scale characteristic parameter includes at least one channel large-scale characteristic parameter. The radio access network device sends the first signaling and the second signaling, so that the first set of configuration parameters and a second set of configuration parameters in the at least one set of configuration parameters associated with the second quasi co-location type are both applied by the terminal device. In this way, the terminal device learns of the at least two quasi co-located antenna ports effective when the first type of channel large-scale characteristic parameter is applied and at least two quasi co-located antenna ports effective when the second type of channel large-scale characteristic parameter is applied. In this design, channel large-scale characteristic parameters are classified, based on functions, into different types that correspond to different quasi co-location types, and a plurality of sets of configuration parameters are configured for each quasi co-location type. A plurality of configuration parameters configured for at least two quasi co-location types are notified to the terminal device by using signaling, so that the terminal device can learn of at least two types of quasi co-located antenna ports corresponding to different types of channel large-scale characteristic parameters. In this way, quasi co-location configuration in a communications system is more adapted to coordinated transmission and reception in 5G New Radio, providing considerable flexibility.

In a possible design, optionally, for a quasi co-location type in the at least two preset quasi co-location types, if the radio access network device and the terminal device both have pre-defined that a specific quasi co-location type represents a determined parameter configuration, the terminal may directly learn of a current QCL configuration from a quasi co-location type delivered in system signaling, for example a name, an index, or an ID of the quasi co-location type, or from a configuration information characteristic or the like associated with the quasi co-location type, and the terminal directly brings the QCL configuration into effect, or brings the configuration into effect according to an effective-time indication of the system. Certainly, quasi co-location type information delivered in the system signaling may also carry an indication for the terminal to determine an effective time of the configuration. The effective time is a time in which the QCL configuration can be applied by the terminal device. How the terminal obtains information about the effective time is not limited in the present application. The configuration information characteristic associated with the quasi co-location type includes a characteristic of configuration information of a reference signal associated with the configuration information associated with the quasi co-location type, for example, a type, an ID, a time-frequency resource location, a time-frequency resource density, or a pilot pattern of the reference signal.

In a possible design, optionally, because at least two quasi co-location types relate to a relatively large quantity of configuration parameters, signaling overheads are relatively large for the system, and the system is heavily loaded if the signaling is carried on the physical layer. Moreover, because system configuration information normally does not need to take effect in real time, at least one of the first signaling and the second signaling can be implemented by using higher layer signaling.

In a possible design, optionally, after the radio access network device sends the first signaling to the terminal device, the access network device sends first instruction information to the terminal device, and the first instruction information is used to instruct the terminal device to apply the first set of configuration parameters in the at least one set of configuration parameters associated with the first quasi co-location type. In this way, the network side instructs the terminal device to select an appropriate set of configuration parameters from a plurality of sets of configuration parameters associated with the first quasi co-location type, and apply the appropriate set of configuration parameters.

In a possible design, optionally, after the radio access network device sends the second signaling to the terminal device, the access network device sends second instruction information to the terminal device, and the second instruction information is used to instruct the terminal device to apply the second set of configuration parameters in the at least one set of configuration parameters associated with the second quasi co-location type. In this way, a network side instructs the terminal device to select an appropriate set of configuration parameters from a plurality of sets of configuration parameters associated with the second quasi co-location type, and apply the appropriate set of configuration parameters.

In a possible design, the first instruction information and the second instruction information may be carried in physical layer signaling and sent by the radio access network device to the terminal device. For example, the first instruction information and the second instruction information may be carried in downlink control information (DCI) of LTE and sent to the terminal device. A specific configuration supposed to be used by the terminal device currently can be dynamically and quickly notified to the terminal device by using the physical layer signaling, and system efficiency is improved.

In a possible design, optionally, the first instruction information and the second instruction information are carried in higher layer signaling and sent by the radio access network device to the terminal device, for example, carried in Radio Resource Control (RRC) signaling of LTE and sent to the terminal device.

In a possible design, optionally, the applied first set of configuration parameters carry first effective-time indication information, and the first-effective-time indication information is used to notify the terminal device of an effective time of the first set of configuration parameters, so that the terminal device learns of an effective time of quasi co-location of the at least two antenna ports effective when the first type of large-scale characteristic parameter is applied; and/or the applied second set of configuration parameters carry second effective-time indication information, and the second effective-time indication information is used to notify the terminal device of an effective time of the second set of configuration parameters, so that the terminal device learns of an effective time of quasi co-location of the at least two antenna ports effective when the second type of large-scale characteristic parameter is applied.

In a possible design, optionally, the access network device sends first effective-time indication signaling to the terminal device, and the first-effective-time indication signaling is used to notify the terminal device of an effective time of the first set of configuration parameters, so that the terminal device learns of an effective time of quasi co-location of the at least two antenna ports effective when the first type of large-scale characteristic parameter is applied; and/or the access network device sends second effective-time indication signaling to the terminal device, and the second effective-time indication signaling is used to notify the terminal device of an effective time of the second set of configuration parameters, so that the terminal device learns of an effective time of quasi co-location of the at least two antenna ports effective when the second type of large-scale characteristic parameter is applied.

In a possible design, optionally, the first type of channel large-scale characteristic parameter is a parameter that represents a spatial characteristic of a beam, and includes any one of or any combination of the following: a receive angle of arrival (AoA), an angle of arrival spread (AoAS), a transmit angle of departure (AoD), an angle of departure spread (AoDS), and a receive antenna spatial correlation (Receiving Antenna Spatial Correlation). With this design, in a 5G system, a channel large-scale characteristic parameter representing spatial information is added to quasi co-location characteristics, and such spatial information and other existing quasi co-location parameters (for example, a delay spread, a Doppler spread, a Doppler shift, an average channel gain, and an average delay in LTE) are decoupled and grouped, to form parameter sets without overlapping QCL types.

The function may be distinguished by using configuration information of the reference signal. The configuration parameter associated with the quasi co-location type may include reference signal indication information, and reference signal configuration information associated with the reference signal may represent a function of the reference signal. For example, the configuration information may include configuration information measured and reported by the UE, and the measured and reported configuration information may include measured and reported information content, format, and the like. The content may be information indicating signal received quality (for example, average reference signal received power (RSRP)), information indicating channel quality (for example, channel state information (CSI), which may include at least one of a channel quality indicator (CQI), a channel rank indicator (RI), a precoding matrix indicator (PMI), a precoding or beamforming matrix, a channel correlation matrix, and the like), an indicator indicating reference signal selection (for example, a channel state information-reference signal (CSI-RS) resource indicator (CRI)), or the like. The format is a format of the reported content, for example, a reported time-frequency resource indication, period indication, code indication, scrambling indication, or power indication. That the function is distinguished by using configuration information of the reference signal may mean that the function of the reference signal may be distinguished based on the reported configuration information associated with the reference signal. For example, when indication information for reporting the RSRP is configured for the reference signal, it indicates that the reference signal is a signal used for beam management; and when a CSI information reporting indication is configured for the reference signal, it indicates that the reference signal is used to obtain signal quality. Alternatively, the reference signal may be distinguished based on other configuration information associated with the reference signal. For example, it may be learned, based on a periodicity and time-frequency resource density configured for the reference signal, that the reference signal is a reference signal used for a function such as frequency offset/timing estimation or channel estimation. In the design of the present application, there is a correspondence between at least one channel large-scale characteristic parameter associated with a quasi co-location type and a reference signal corresponding to configuration information in the quasi co-location type.

According to a second aspect, from the perspective of a terminal device side, this application provides a data transmission method for wireless communication, including: receiving, by a terminal, first signaling from a radio access network device, where the first signaling includes a first quasi co-location type, the first quasi co-location type is associated with at least one set of configuration parameters, and the first signaling further includes the at least one set of configuration parameters associated with the first quasi co-location type. The first quasi co-location type is one of at least two preset quasi co-location types, and each of the preset quasi co-location types is associated with at least one channel large-scale characteristic parameter. The first quasi co-location type is associated with a first type of channel large-scale characteristic parameter, and the first type of channel large-scale characteristic parameter includes the at least one channel large-scale characteristic parameter. The terminal device receives the first signaling, and applies a first set of configuration parameters in the at least one set of configuration parameters associated with the first quasi co-location type, to learn of at least two quasi co-located antenna ports effective when the at least one channel large-scale characteristic parameter associated with the first quasi co-location type is applied.

In a possible design, optionally, after the terminal device receives the first signaling sent by the radio access network device, the terminal device further receives second signaling sent by the radio access network device, where the second signaling includes a second quasi co-location type, the second quasi co-location type is associated with at least one set of configuration parameters, and the second signaling further includes the at least one set of configuration parameters associated with the second quasi co-location type. The second quasi co-location type is one of the at least two preset quasi co-location types, the second quasi co-location type is associated with a second type of channel large-scale characteristic parameter, and the second type of channel large-scale characteristic parameter includes at least one channel large-scale characteristic parameter. The terminal device receives the first signaling and the second signaling, and applies the first set of configuration parameters and a second set of configuration parameters in the at least one set of configuration parameters associated with the second quasi co-location type. In this way, the terminal device learns of the at least two quasi co-located antenna ports effective when the first type of channel large-scale characteristic parameter is applied and at least two quasi co-located antenna ports effective when the second type of channel large-scale characteristic parameter is applied. In this design, channel large-scale characteristic parameters are classified, based on functions, into different types that correspond to different quasi co-location types, and a plurality of sets of configuration parameters are configured for each quasi co-location type. A plurality of configuration parameters configured for at least two quasi co-location types are notified to the terminal device by using signaling, so that the terminal device can learn of at least two types of quasi co-located antenna ports corresponding to different types of channel large-scale characteristic parameters. In this way, quasi co-location configuration in a communications system is more adapted to coordinated transmission and reception in 5G New Radio, providing considerable flexibility.

In a possible design, optionally, because at least two quasi co-location types relate to a relatively large quantity of configuration parameters, signaling overheads are relatively large for the system, and the system is heavily loaded if the signaling is carried on the physical layer. Moreover, because system configuration information normally does not need to take effect in real time, at least one of the first signaling and the second signaling can be implemented by using higher layer signaling in a wireless communications system.

In a possible design, optionally, after the terminal device receives the first signaling sent by the radio access network device, the terminal device further receives first instruction information sent by the access network device, and the first instruction information is used to instruct the terminal device to apply the first set of configuration parameters in the at least one set of configuration parameters associated with the first quasi co-location type. In this way, the terminal device can select, by using instruction information sent by a network side, an appropriate set of configuration parameters from a plurality of sets of configuration parameters associated with the first quasi co-location type, and apply the appropriate set of configuration parameters.

In a possible design, optionally, after the terminal device receives the second signaling sent by the radio access network device, the terminal device further receives second instruction information sent by the access network device, and the second instruction information is used to instruct the terminal device to apply the second set of configuration parameters in the at least one set of configuration parameters associated with the second quasi co-location type. In this way, the terminal device can select, by using instruction information sent by a network side, an appropriate set of configuration parameters from a plurality of sets of configuration parameters associated with the second quasi co-location type, and apply the appropriate set of configuration parameters.

In a possible design, the first instruction information and the second instruction information may be carried in physical layer signaling, and the terminal device receives physical layer signaling sent by the radio access network device, to obtain the first instruction information and the second instruction information. For example, the first instruction information and the second instruction information may be carried in downlink control information (DCI) of LTE and sent to the terminal device. A specific configuration supposed to be used by the terminal device currently can be dynamically and quickly notified to the terminal device by using the physical layer signaling, and system efficiency is improved.

In a possible design, optionally, the first instruction information and the second instruction information are carried in higher layer signaling, and the terminal device receives higher layer signaling sent by the radio access network device, to obtain the first instruction information and the second instruction information. For example, instruction information with a similar function is carried in Radio Resource Control (RRC) signaling of LTE and sent to the terminal device.

In a possible design, optionally, the applied first set of configuration parameters carry first effective-time indication information, and the first-effective-time indication information is used to notify the terminal device of an effective time of the first set of configuration parameters, so that the terminal device learns of an effective time of quasi co-location of the at least two antenna ports effective when the first type of large-scale characteristic parameter is applied; and/or the applied second set of configuration parameters carry second effective-time indication information, and the second effective-time indication information is used to notify the terminal device of an effective time of the second set of configuration parameters, so that the terminal device learns of an effective time of quasi co-location of the at least two antenna ports effective when the second type of large-scale characteristic parameter is applied.

In a possible design, optionally, the terminal device further receives first effective-time indication signaling sent by the access network device, and the first-effective-time indication signaling is used to notify the terminal device of an effective time of the first set of configuration parameters, so that the terminal device learns of an effective time of quasi co-location of the at least two antenna ports effective when the first type of large-scale characteristic parameter is applied; and/or the terminal device further receives second effective-time indication signaling sent by the radio access network device, and the second effective-time indication signaling is used to notify the terminal device of an effective time of the second set of configuration parameters, so that the terminal device can learn an effective time of quasi co-location of the at least two antenna ports effective when the second type of large-scale characteristic parameter is applied.

In a possible design, optionally, the first type of channel large-scale characteristic parameter is a parameter that represents a spatial characteristic of a beam, and includes any one of or any combination of the following: a receive angle of arrival (AoA), an angle of arrival spread (AoAS), a transmit angle of departure (AoD), an angle of departure spread (AoDS), and a receive antenna spatial correlation (Receiving Antenna Spatial Correlation). With this design, in a 5G system, a channel large-scale characteristic parameter representing spatial information is added to quasi co-location characteristics, and such spatial information and other existing quasi co-location parameters (for example, a delay spread, a Doppler spread, a Doppler shift, an average channel gain, and an average delay in LTE) are decoupled and grouped, to form parameter sets without overlapping QCL types.

According to a third aspect, this application provides a radio access network device. The radio access network device includes at least one processor, a transceiver, a memory, and a bus; the at least one processor, the transceiver, and the memory communicate with each other via the bus; the transceiver is used by the radio access network device to communicate with other devices; the memory is configured to store an instruction; and when the radio access network device runs, the at least one processor executes the instruction stored in the memory, so that the radio access network device performs any method according to the first aspect.

According to a fourth aspect, this application provides a terminal device. The terminal device includes at least one processor, a transceiver, a memory, and a bus; the at least one processor, the transceiver, and the memory communicate with each other via the bus; the transceiver is used by the terminal device to communicate with other devices; the memory is configured to store an instruction; and when the terminal device runs, the at least one processor executes the instruction stored in the memory, so that the terminal device performs any method according to the second aspect.

According to a fifth aspect, this application provides a system chip, applied to a radio access network device. The system chip includes at least one processor, a communications interface, a memory, and a bus; the at least one processor, the memory, and the communications interface communicate with each other via the bus; the communications interface is used by the system chip to communicate with other devices; the memory is configured to store an instruction; and when the system chip runs, the at least one processor executes the instruction stored in the memory, so that the radio access network device performs any method according to the first aspect.

According to a sixth aspect, this application provides a system chip, applied to a terminal device. The system chip includes at least one processor, a communications interface, a memory, and a bus; the at least one processor, the memory, and the communications interface communicate with each other via the bus; the communications interface is used by the system chip to communicate with other devices; the memory is configured to store an instruction; and when the system chip runs, the at least one processor executes the instruction stored in the memory, so that the terminal device performs any method according to the second aspect.

According to a seventh aspect, this application provides a communications system, and the system includes the radio access network device according to the third aspect and the terminal device according to the fourth aspect.

According to an eighth aspect, this application provides a computer storage medium, configured to store a computer software instruction used by the radio access network device, and the computer software instruction includes a program designed for performing any method according to the first aspect.

According to a ninth aspect, this application provides a computer storage medium, configured to store a computer software instruction used by the terminal device, and the computer software instruction includes a program designed for performing any method according to the second aspect.

Two apparatuses, one having as the same function as the foregoing radio access network device and the other having the same function as the foregoing terminal device may be applied to a typical communications design between a wireless base station and a mobile phone, and may also be applied to a communications design in a device-to-device (D2D) or machine-to-machine (M2M) scenario, and may also be applied to communication between network-side devices, for example, a communications design between a macro base station and an access point. When applied to different scenarios, the two functional entities related in the present application may no longer be named "radio access network device" and "terminal device", but device names fit for the applied scenario are used.

In comparison with the prior art, the data transmission method, apparatus, and system for wireless communication, and the related system chip, computer storage medium, and the like described in this application classify, based on functions, channel large-scale characteristic parameters into different types that correspond to different quasi co-location types, and a plurality of sets of configuration parameters are configured for each quasi co-location type. A plurality of configuration parameters configured for at least two quasi co-location types are notified to the terminal device by using signaling, so that the terminal device learns of at least two types of quasi co-located antenna ports corresponding to different types of channel large-scale characteristic parameters. In this way, quasi co-location configuration in the communications system is more adapted to coordinated transmission and reception in 5G New Radio, providing considerable flexibility.

DESCRIPTION OF EMBODIMENTS

Technical solutions in embodiments of this application are described below with reference to the accompanying drawings. The described embodiments are merely some but not all of the embodiments of this application. Other embodiments obtained by a person of ordinary skill in the art based on the embodiments of this application without creative efforts may fall within the protection scope of the present application.

A network architecture and a service scenario that are described in embodiments of this application are intended to more clearly describe technical solutions in embodiments of this application, and do not constitute a limitation on technical solutions provided in embodiments of this application. A person of ordinary skill in the art knows that technical solutions provided in embodiments of this application are also applicable to similar technical problems with evolution of network architecture and emergence of new service scenarios.

Figure 1:
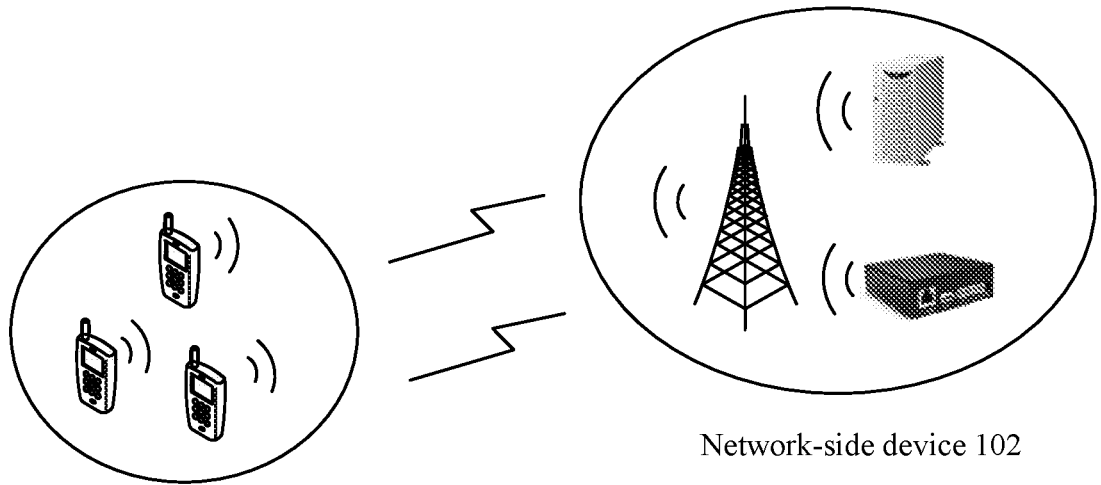
FIG. 1 is a schematic diagram of a possible application scenario of this application.

Technology described in this application may be applicable to LTE systems and later evolved systems such as a fifth generation mobile communications (5th generation mobile communications, 5G) system, or other wireless communications systems that use an orthogonal frequency division multiplexing (OFDM) access technology, and in particular, to a communications system that involves a quasi co-location design for antenna ports. FIG. 1 is a schematic diagram of a possible application scenario of this application. In a feasible wireless communications system 100, when a terminal device is user equipment (UE), the user equipment 101 accesses and communicates with a network-side device 102 by using a radio interface, or may communicate with another user equipment, for example, in a device-to-device (D2D) or machine-to-machine (M2M) scenario. The network-side device 102 may communicate with the user equipment, or may communicate with another network-side device, for example, communication between a macro base station and an access point.

Some general concepts or definitions referred to in embodiments of this application are explained below. It should be noted that some English abbreviations in this specification are described in the embodiments of this application by using an LTE system as an example, and may change with network evolution. Terms or expressions with similar functions may change. For specific evolution, refer to descriptions in corresponding standards.

In this application, nouns "network" and "system" are interchangeably used frequently, but a person skilled in the art can understand meanings of "network" and "system".

A terminal device in this application may include various handheld devices, in-vehicle devices, wearable devices, computing devices, or control devices that have a wireless communication function, or other processing devices connected to a wireless modem, or various user equipment (UE), mobile stations (MS), terminals, terminal devices (Terminal Equipment), or the like defined in existing communications protocols, or may be a fixed communications apparatus that has a wireless function, or the like. A name of the terminal device is not limited provided that the terminal device has a similar wireless communication function. For ease of description, in this application, the devices mentioned above are collectively referred to as a terminal device.

A radio access network device in this application may be a transmit-receive point, a base station (BS), a network controller, a mobile switching center, or the like. An apparatus that directly communicates with user equipment by using a radio channel is usually a base station, and the base station may include various macro base stations, micro base stations, relay stations, access points, remote radio units (RRU), or the like. Certainly, other network-side devices with a wireless communication function may perform wireless communication with the user equipment. This is not limited in this application. In different systems, a device with a base station function may have different names. For example, in an LTE network, the device may be referred to as an evolved NodeB (eNB, or eNodeB); in a 3rd Generation (3G) network, the device may be referred to as a NodeB; and in a next-generation communications system such as a 5G system, the base station is also referred to as a gNB.

Technical solutions provided in this application may be applied to uplink data transmission and/or downlink data transmission. For uplink data transmission, a data sending device may be user equipment, and a data receiving device may be a network-side device, for example, a base station. For downlink data transmission, a data sending device may be a network-side device, for example, a base station, and a data receiving device may be user equipment.

The "data" described in this application is usually service data, but may also include content such as signaling and messages that a system needs to transmit, for example, a reference signal or an uplink-downlink control message. A specific meaning of the data may depend on a scenario and context in which the term is used.

The term "and/or" in this application describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that expressions such as "first" and "second" in this application are only a naming method used to make to-be-described objects easier to be distinguished, and shall not constitute any limitation on the present application.

For the concept of quasi co-location (Quasi-co-location, QCL) in this application, it is usually considered that when a channel large-scale characteristic parameter of a second antenna port can be derived from a channel large-scale characteristic parameter of a first antenna port, these two antenna ports are quasi co-located. When having a quasi co-location relationship, two antenna ports have same channel large-scale characteristic parameters, and the channel large-scale characteristic parameter includes one or more of the following: a delay spread, a Doppler spread, a Doppler shift, an average gain, and an average delay. After obtaining a quasi co-location assumption, the terminal device may compensate for a to-be-processed reference signal by using information about a known reference signal, to improve performance in aspects such as equivalent channel measurement and data demodulation. For example, after obtaining quasi co-location configuration information, the terminal device may compensate for demodulation reference signal (DMRS) processing and physical downlink shared channel (PDSCH) demodulation by using some channel information obtained from a channel state information-reference signal (CSI-RS). Because CoMP can dynamically switch between TRPs, a quasi co-located relationship between the DMRS and the CSI-RS may be used to improve DMRS-based equivalent channel estimation performance of the UE, thereby improving receiving performance of the UE.

In LTE releases, large-scale information indicated by quasi co-location includes "delay spread, Doppler spread, Doppler shift, average gain, and average delay". The UE assumes, according to a QCL behavior and indication information that are configured by a network-side device, a QCL relationship of large-scale characteristics corresponding to antenna ports. Two QCL configurations are defined for a transmission mode (TM) 10: a type A (Type-A) and a type B (Type-B). Specifically, whether the type A or the type B is used may be configured by using higher layer signaling qcl-Operation.

For the type A, it is assumed that all cell-specific reference signal (CRS) antenna ports, DMRS antenna ports, and CSI-RS antenna ports all have the QCL relationship. For the type B, a network-side base station first configures indicators of there being a maximum of four non-zero power (NZP) CSI-RS IDs by using RRC signaling qcl-CSI-RS-ConfigNZPId-r11, and then the base station indicates, by using physical layer signaling such as a PDSCH resource element mapping and quasi co-location indicator (PDSCH RE Mapping and Quasi-Co-Location Indicator, PQI) represented by two bits in a downlink control information format 2D (DCI format 2D), a specific set of QCL parameters that the terminal is supposed to apply, as shown in the following Table 1:

TABLE 1

| Value of PDSCH RE mapping and quasi co-location indicator | Description |
| --- | --- |
| '00' | First set of parameters configured by higher layers |
| '01' | Second set of parameters configured by higher layers |
| '10' | Third set of parameters configured by higher layers |
| '11' | Fourth set of parameters configured by higher layers |

As shown in Table 1, there may be four values for the PDSCH RE mapping and quasi co-location indicator, and the four values are respectively used to indicate a specific set of configuration parameters that is to be specifically used by the terminal. As defined in Table 1, when values of two bits of the PDSCH RE mapping and quasi co-location indicator are '00', it indicates that the terminal applies the first set of configuration parameters; when values of two bits of the PDSCH RE mapping and quasi co-location indicator are '01', it indicates that the terminal applies the second set of configuration parameters; when values of two bits of the PDSCH RE mapping and quasi co-location indicator are '10', it indicates that the terminal applies the third set of configuration parameters; and when values of two bits of the PDSCH RE mapping and quasi co-location indicator are '11', it indicates that the terminal applies the fourth set of configuration parameters.

For each set of parameters configured by the higher layer, an RRC signaling parameter is used as an example herein, and each set of parameters related to QCL includes:
 crs-PortsCount-r11.
 qcl-CSI-RS-ConfigNZPId-r11.

"crs-PortsCount-r11" is a port number of a CRS. "qcl-CSI-RS-ConfigNZPId-r11" is an NZP CSI-RS resource number indicated by QCL, namely, a number of a non-zero power (non zero power) CSI-RS resource, and may be used to notify the UE of a specific non-zero power CSI-RS with which a currently sent DMRS is quasi co-located.

After obtaining quasi co-located information, the UE may compensate for DMRS processing and PDSCH demodulation by using some channel information obtained from the CSI-RS. Because CoMP can dynamically switch between TRPs, a quasi co-located relationship between the DMRS and the CSI-RS may be used to improve DMRS-based equivalent channel estimation performance of the UE, thereby improving receiving performance of the UE.

However, this LTE downlink transmission mode technology has the following disadvantages: 1. In this solution, it is considered that all DMRS ports on a same TRP are QCL, but in 5G NR, because a same TRP may include different antenna panels, DMRS ports that belong to different antenna panels on the same TPR may be non-QCL. In this way, when coordinated/switching transmission is performed between different panels, the foregoing QCL configuration of the type A and the type B cannot resolve this problem, causes a performance loss, and cannot support a more flexible transmission mode. 2. The current method using the PQI indicator is not flexible enough, and if a coordination manner of more TRPs in the 5G NR needs to be supported, the PQI indicator is more complex, and signaling overheads are increased. It is difficult to extend the current solution to the NR.

Figure 2:
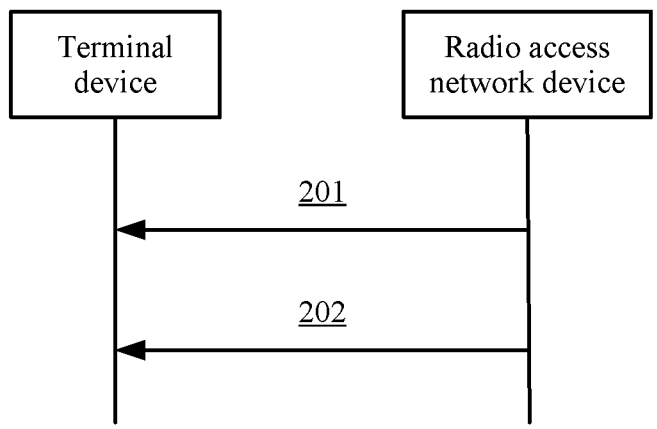
FIG. 2 is a schematic flowchart of a data transmission method for wireless communication according to an embodiment of this application.

In view of this, FIG. 2 is a schematic flowchart of a data transmission method 200 for wireless communication described from the perspective of device interaction according to an embodiment of this application. The method 200 may be used in a communications system in which communication is performed by using a wireless air interface, and the communications system may include a radio access network device and a terminal device. For example, the communications system may be similar to a wireless communications system 100 shown in FIG. 1.

Generally, the method 200 is described in detail below by using interaction between the radio access network device and the terminal device as an example.

As shown in the figure, the method includes the following steps.

Step 201: A radio access network device sends first signaling to a terminal device, where the first signaling includes a first quasi co-location type, the first quasi co-location type is associated with at least one set of configuration parameters, and the first signaling further includes the at least one set of configuration parameters associated with the first quasi co-location type. The first quasi co-location type is one of at least two preset quasi co-location types, and each of the preset quasi co-location types is associated with at least one channel large-scale characteristic parameter. The first quasi co-location type is associated with a first type of channel large-scale characteristic parameter, and the first type of channel large-scale characteristic parameter includes at least one channel large-scale characteristic parameter. The radio access network device sends the first signaling, so that the terminal device applies a first set of configuration parameters in the at least one set of configuration parameters associated with the first quasi co-location type, thereby helping the terminal device learn of at least two quasi co-located antenna ports effective when the at least one channel large-scale characteristic parameter associated with the first quasi co-location type is applied.

Optionally, in a possible implementation, channel large-scale characteristic parameters may be classified according to a preset rule, different types of channel large-scale characteristic parameters respectively correspond to different quasi co-location types, and channel large-scale characteristic parameters associated with different quasi co-location types may be the same or may not overlap.

Figure 3:
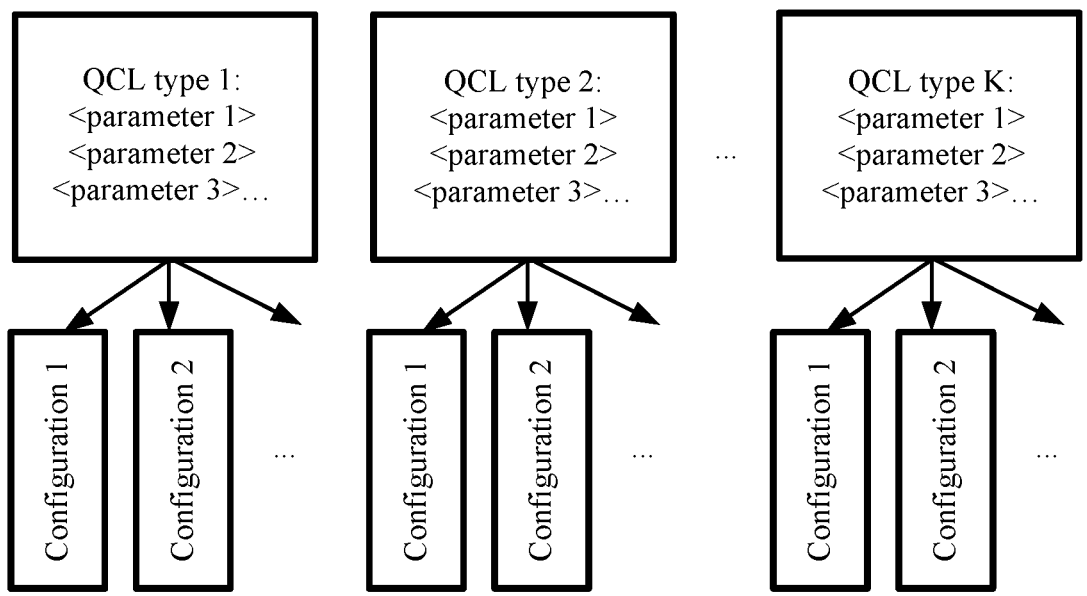
FIG. 3 is a schematic diagram of a QCL configuration in a data transmission method for wireless communication according to an embodiment of this application.

FIG. 3 shows a QCL type forming and configuration method 300. In this method example, 1, 2, 3, . . . , and K QCL types (K may be a positive integer greater than or equal to 1) are defined, and each QCL type is associated with at least one parameter. For example, a QCL type 1 is associated with at least a plurality of parameters such as <parameter 1>, <parameter 2>, <parameter 3>, <parameter 4>, . . . , and multiple parameter configurations are configured for the QCL type 1, such as, a configuration 1, a configuration 2, . . . ; and so on.

In a possible design, optionally, configuration signaling of each QCL type includes at least the following content: information indicating an antenna port, and information indicating whether to assume QCL. This configuration indicates whether a large-scale characteristic that is corresponding to the antenna port and that is of a QCL set in which the configuration is located is QCL.

In a possible design, optionally, large-scale characteristic parameters of the QCL are grouped based on reference signal functions, and parameters between sets overlap, as shown in the following Table 2.

TABLE 2

| QCL type | Reference signal (RS) function | Channel large-scale characteristic parameter |
| --- | --- | --- |
| 1 | Beam management | Angle of arrival of a beam or other parameter(s) that represents spatial information of a beam |
| 2 | Phase noise estimation | Doppler shift |
| 3 | Frequency offset/timing estimation | Doppler shift, Doppler spread, average delay, and delay spread |
| 4 | Radio resource management (RRM) measurement | Average channel gain |
| 5 | Channel estimation | Average channel gain, Doppler shift, Doppler spread, average delay, and delay spread |

As shown in Table 2, channel large-scale characteristic parameters of QCL are classified into five QCL sets with overlapping parameters, and the five QCL sets are referred to as QCL types 1 to 5. Based on the foregoing idea, in this possible design, the sets of the channel large-scale characteristic parameters may be further subdivided or extended to more QCL types based on functions and characteristics of ports, or the sets are combined to form a QCL type indicator with lower complexity.

As shown in Table 2, for the QCL type 1, a beam management reference signal (Beam management RS, BRS) port may be configured. The BRS may be an independent RS, or may reuse another RS. One or more pieces of configuration information may be configured in the type 1, for example, a "configuration 1" includes a plurality of BRS ports, to indicate that angles of arrival of a beam that are corresponding to these BRS ports or other large-scale characteristics that represent spatial information of a beam and that are corresponding to these BRS ports are QCL. The BRS ports included in this configuration may be all or some BRS ports that are used.

In a feasible design, the beam management reference signal may reuse another RS, and the reused another RS may be any one or more of a cell-specific CSI-RS, a synchronization signal (SS), and a unit in which the synchronization signal is located.

The configuration information includes information about at least one signal. The signal may be any one or more of the following: a cell-specific reference signal, a non-zero power CSI-RS, a zero power CSI-RS, a synchronization signal (SS), a DMRS on a PDSCH, a DMRS or the like on a physical broadcasting channel (physical broadcast channel, PBCH), a zero power DMRS, a sounding reference signal (SRS), a random access channel PRACH, a DMRS on a PUSCH, a DMRS on a PUCCH, and a tracking reference signal (tracking RS) used for time and/or frequency domain synchronization tracking.

Correspondingly, the signal may be indicated by an antenna port number of an indication signal, a quantity of antenna ports, a pilot pattern, a pilot sequence, a time domain resource location, a frequency domain resource location, a resource identifier, a precoding identifier, or the like. The time domain resource location may be a frame, a subframe, a timeslot, a mini timeslot, an OFDM symbol, or the like.

Optionally, the one or more pieces of configuration information that may be configured in the type 1 may be a QCL relationship between a set of antenna ports that is about a spatial parameter.

A base station may configure the one or more pieces of configuration information in the type 1 by using any one of an RRC message, a MAC layer information element, and downlink control information, and send the configuration information to the terminal device.

Specifically, the configuration by using the RRC message may be performed in any one of the following methods.

In one method, the base station adds the following information to the RRC message and sends the RRC message to the terminal:

QCL information element

Identifier of a CSI-RS signal, for example, a resource ID of the CSI-RS

Identifier of a synchronization signal, for example, a time domain identifier of a resource in which the SS is located Identifier of a DMRS signal, for example, an identifier of an antenna port (group) of the DMRS Identifier of an SRS signal, for example, a resource identifier of the SRS As described above, the RRC message carries a QCL information element. In the information element, the base station indicates a plurality of signals to UE, for example, the shown CSI-RS, SS, DMRS, and SRS, to indicate that antenna ports corresponding to these signals indicated by the UE pairwise meet a QCL relationship about large-scale parameter spatial information in the type 1.

In another method, the base station performs configuration at the following levels in the RRC message:

Configuration field of a CSI-RS

Identifier of an SS signal and

Configuration field of a DMRS

Identifier of a CSI-RS signal

A meaning of the method is that the base station configures a QCL relationship between a plurality of signal pairs. For example, the CSI-RS and the synchronization signal SS are one signal pair, and the CSI-RS and the DMRS are another signal pair. A QCL relationship of one signal pair may indicate a QCL relationship between the two signals by configuring information about one signal inside the other signal in the signal pair. The UE may learn of, by receiving the configuration, a QCL relationship between an SS block and the CSI-RS, a QCL relationship between the CSI-RS and the DMRS, and the like.

Optionally, the base station may configure a plurality of sets of configurations in the RRC message for the UE, and each set of configurations includes a QCL relationship between the foregoing plurality of signals. A specific configuration may be implemented by using one of the foregoing two methods. The base station activates or triggers one or more sets of configuration information in a MAC information element and/or downlink control information. For example, the base station configures a plurality of sets of configuration information in the RRC message by using the foregoing two methods, and each set of information includes a QCL relationship between a plurality of signals:

Configuration 1: a CSI-RS resource 1, an SS block time index 1, and a DMRS port group 1;

Configuration 2: a CSI-RS resource 2, an SS block time index 2, and a DMRS port group 2;

Configuration 3: a CSI-RS resource 3, an SS block time index 3, and a DMRS port group 3; and Configuration 4: a CSI-RS resource 4, an SS block time index 4, and a DMRS port group 4.

The CSI-RS resources 1 to 4, the SS block time indexes 1 to 4, and the DMRS port groups 1 to 4 are respectively signal identifiers of the CSI-RS, the SS, and the DMRS. The resource identifier, the time domain identifier, and the antenna port group identifier may be alternatively replaced with the foregoing other identifiers.

The base station indicates one set of configurations in the DCI, for example, indicates one of the configurations 1 to 4 in the DCI. Alternatively, the base station indicates a plurality of sets of configurations in the DCI, for example, indicates two of the configurations 1 to 4 in the DCI. For example, the base station instructs to bring the configuration 1 and the configuration 2 into effect. The UE learns that a DMRS antenna port in the DMRS port group 1 is in a QCL relationship with a CSI-RS antenna port of the CSI-RS resource 1 and an SS signal in the SS block time index 1, and that a DMRS antenna port in the DMRS port group 2 is in a QCL relationship with a CSI-RS antenna port of the CSI-RS resource 2 and an SS signal in the SS block time index 2.

The base station obtains, by using at least one of the RRC message, the MAC information element, and the downlink control information, a QCL relationship between a plurality of sets of signals that is about spatial information.

For the QCL type 2, one or more configurations of the type 2 may be configured. For example, two configurations are set for the type 2, a configuration 1 is that all antenna ports used for phase noise estimation are QCL, and a configuration 2 is that all antenna ports used for phase noise estimation are non-QCL.

When the base station instructs the UE to apply the configuration 1 in the type 2, the UE needs to assume that phase noise estimation information on all antenna ports used for phase noise estimation is consistent. In this case, phase noise information estimated by the UE on one antenna port may be used for another antenna port; in other words, phase noise may be estimated by using one antenna port. When the base station instructs the UE to apply the configuration 2 in the type 2, the UE cannot assume that antenna ports used for phase noise estimation are QCL, and therefore, a phase noise result estimated by the UE on one antenna port cannot be used for another antenna port. This case is applicable to a case in which when phase noise is relatively severe, the base station configures the configuration 2 corresponding to the QCL type 2, and the UE estimates phase noise on each antenna port.

Similarly, one or more pieces of corresponding configuration information are configured in the QCL types 3 to 5. Each configuration corresponds to an RS type and a port number that are corresponding to the large-scale characteristic and that need to be indicated to the UE, and notifies the UE of a QCL relationship of large-scale information in QCL types corresponding to these ports.

In a possible design, optionally, for a quasi co-location type in the at least two preset quasi co-location types, if the radio access network device and the terminal device have pre-defined that a specific quasi co-location type represents a determined parameter configuration, the terminal may directly learn of a current QCL configuration from a quasi co-location type delivered in system signaling, for example, a name, an index, or an ID of the quasi co-location type, and the terminal directly brings the QCL configuration into effect, or brings the configuration into effect according to an effective-time indication of the system. Certainly, quasi co-location type information delivered in the system signaling may also carry an indication for the terminal to determine an effective time of the configuration.

Step 202: As shown in FIG. 2, after the radio access network device sends the first signaling to the terminal device, the radio access network device further sends second signaling to the terminal device, where the second signaling includes a second quasi co-location type, the second quasi co-location type is associated with at least one set of configuration parameters, and the second signaling further includes the at least one set of configuration parameters associated with the second quasi co-location type. The second quasi co-location type is one of the at least two preset quasi co-location types, the second quasi co-location type is associated with a second type of channel large-scale characteristic parameter, and the second type of channel large-scale characteristic parameter includes at least one channel large-scale characteristic parameter. The radio access network device sends the first signaling and the second signaling, so that the terminal device applies the first set of configuration parameters and a second set of configuration parameters in the at least one set of configuration parameters associated with the second quasi co-location type. In this way, the terminal device learns of the at least two quasi co-located antenna ports effective when the first type of channel large-scale characteristic parameter is applied and at least two quasi co-located antenna ports effective when the second type of channel large-scale characteristic parameter is applied.

In this design, channel large-scale characteristic parameters are classified, based on functions, into different types that correspond to different quasi co-location types, and a plurality of sets of configuration parameters are configured for each quasi co-location type. A plurality of configuration parameters configured for at least two quasi co-location types are notified to the terminal device by using signaling, so that the terminal device can learn of at least two types of quasi co-located antenna ports corresponding to different types of channel large-scale characteristic parameters. In this way, quasi co-location configuration in a communications system is more adapted to coordinated transmission and reception in 5G New Radio, providing considerable flexibility.

In a possible design, optionally, because at least two quasi co-location types relate to a relatively large quantity of configuration parameters, signaling overheads are relatively large for the system, and the system is heavily loaded if the signaling is carried on the physical layer. Moreover, because system configuration information normally does not need to take effect in real time, at least one of the first signaling and the second signaling can be implemented by using higher layer signaling.

Certainly, optionally, when a relatively fast configuration is required, the foregoing QCL configuration information may be delivered to the terminal by using physical layer signaling.

In a possible design, optionally, after the radio access network device sends the first signaling to the terminal device, the access network device sends first instruction information to the terminal device, and the first instruction information is used to instruct the terminal device to apply the first set of configuration parameters in the at least one set of configuration parameters associated with the first quasi co-location type. In this way, a network side instructs the terminal device to select an appropriate set of configuration parameters from a plurality of sets of configuration parameters associated with the first quasi co-location type, and apply the appropriate set of configuration parameters.

In a possible design, optionally, after the radio access network device sends the second signaling to the terminal device, the access network device sends second instruction information to the terminal device, and the second instruction information is used to instruct the terminal device to apply the second set of configuration parameters in the at least one set of configuration parameters associated with the second quasi co-location type. In this way, a network side instructs the terminal device to select an appropriate set of configuration parameters from a plurality of sets of configuration parameters associated with the second quasi co-location type, and apply the appropriate set of configuration parameters.

Figure 4:
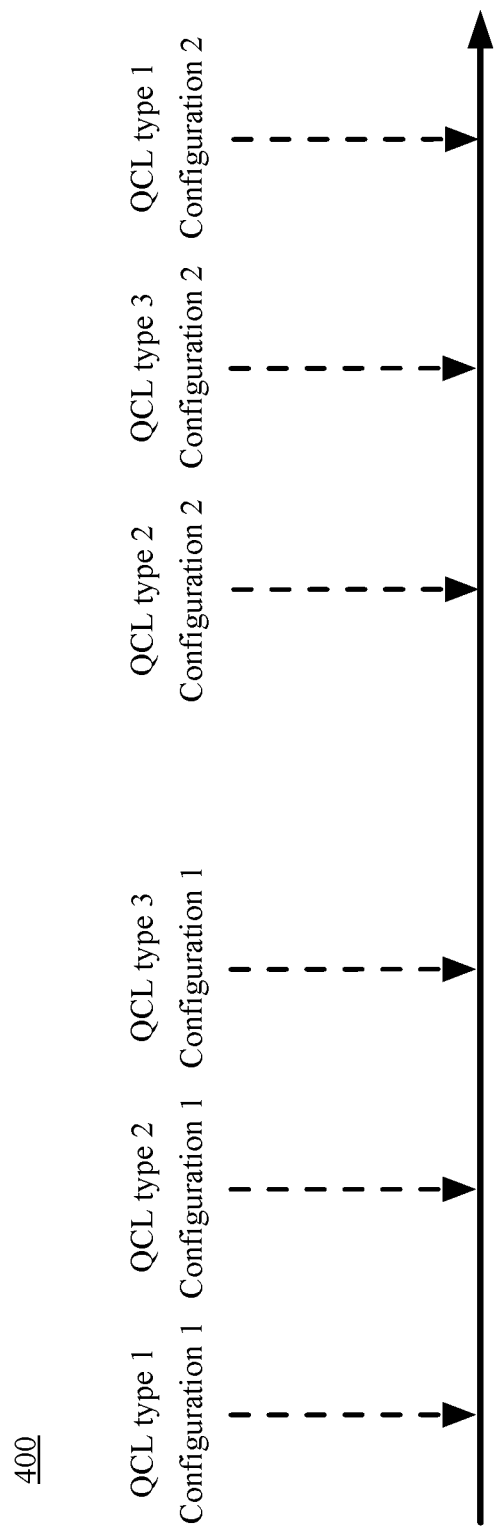
FIG. 4 is a schematic diagram of a QCL configuration indication manner in a data transmission method for wireless communication according to an embodiment of this application.

For example, optionally, FIG. 4 shows a method 400 for indicating a plurality of configurations based on a plurality of sets of QCL types. Based on this method, the base station may combine all sets of QCL parameters or independently indicate each set of QCL parameters to the UE on a same time-frequency resource or different time-frequency resources. For example, FIG. 4 shows an example of independently performing indication at different times. The base station indicates, at a specific moment, the UE to apply a configuration 1 for a QCL type 1, and then successively instructs, at subsequent moments, the UE to apply a configuration 2 for a QCL type 2 and apply a configuration 1 for a QCL type 3; and so on.

In a possible design, instruction information used above, for example, the first instruction information and the second instruction information, may be carried in physical layer signaling and sent by the radio access network device to the terminal device. For example, the first instruction information and the second instruction information may be carried in downlink control information (DCI) of LTE and sent to the terminal device. A specific configuration supposed to be used by the terminal device currently can be dynamically and quickly notified to the terminal device by using the physical layer signaling, and system efficiency is improved.

In a possible design, optionally, the first instruction information and the second instruction information may alternatively be carried in higher layer signaling and sent by the radio access network device to the terminal device. For example, the first instruction information and the second instruction information are carried in Radio Resource Control (RRC) signaling of LTE and sent to the terminal device.

For example, the instruction information is carried in an RRC information element QuasiCoLocationIndication and sent to the terminal device. A name of the information element is not limited herein. A presentation and existence manner of the information element may be optional or mandatory. If the presentation and existence manner is optional, the presentation and existence manner is denoted as OPTIONAL in syntax of the information element QuasiCoLocationIndication. When the information element QuasiCoLocationIndication is optional, the information element QuasiCoLocationIndication has a label of an optional reading manner. The label may be —COND, which indicates that the information element is read after the information element meets a specific condition; or the label may be—Need OP, which indicates that the information element is optional. If the information element QuasiCoLocation-Indication is missing or does not exist, the UE performs no action. Alternatively, the label may be—Need ON, and in this case, when the information element QuasiCoLocation-Indication is missing or does not exist, the UE determines a behavior assumption of QCL by using an existing configuration. Alternatively, the label may be—Need OR, and in this case, when the information element QuasiCoLocation-Indication is missing or does not exist, the UE no longer applies a configuration of an existing QCL assumption. In this case, a possible implementation is that the UE uses a predefined QCL assumption as a channel large-scale characteristic assumption between antenna ports. If it is assumed that, except that agreed upon, channel large-scale characteristics that are between antenna ports and that are not indicated by the information element cannot be inferred from each other, the antenna ports are non-QCL.

Several optional behaviors of the information element are used as possible implementations herein. Several feasible indication manners of the information element QuasiCoLocationIndication are described below. Optional behaviors of the information element are not marked herein.

A first optional behavior is:
QuasiCoLocationIndication::=INTEGER (1, . . . , X)

Corresponding to Table 2, X may be 5; corresponding to Table 3, X may be 2; and corresponding to Table 4, and X may be 6. A meaning borne by this information element is a specific one, used by a signaling indication, of the QCL parameter sets shown in the table. For large-scale characteristic parameter sets 1 to X, when a configured information element parameter is a number in 1, 2, . . . , and X, it indicates that the information element is an indicated corresponding QCL parameter set, for example, a number 1 indicates a QCL parameter set 1, a number 2 indicates a QCL parameter set 2, and so on. Herein, a value range of the information element is not limited, and may be a possible implementation such as INTEGER (1, . . . , X) or INTEGER (0, . . . , X−1). Herein, a sequence in a one-to-one correspondence between a value range and a QCL parameter set is not limited.

A second optional behavior is:
QuasiCoLocationIndication::=ENUMERATED (q1, q2, q3, . . . , qX)

A meaning borne by this information element is a specific one, used by a signaling indication, of the QCL parameter sets shown in the table. Herein, a sequence in a one-to-one correspondence between a value range and a QCL parameter set is not limited.

For example, corresponding to Table 3, a value range of the information element is ENUMERATED (q1, q2). When a value of the information element is q1, it indicates a QCL behavior assumption of a large-scale characteristic of spatial information corresponding to the QCL configuration information; when a value of the information element is q2, it indicates a QCL behavior assumption of a large-scale characteristic of an average channel gain, a Doppler shift, a Doppler spread, an average delay, or a delay spread corresponding to the QCL configuration information.

Alternatively, for example, corresponding to Table 4, a value range of the information element is ENUMERATED (q1, q2, q3, q4, q5, q6), and when a range of the information element is q1, q2, q3, q4, q5, or q6, it respectively represents a QCL behavior assumption of a large-scale characteristic of spatial information, an average channel gain, a Doppler shift, a Doppler spread, an average delay, or a delay spread corresponding to the QCL configuration information.

Alternatively, as shown in the foregoing Table 2, channel large-scale characteristic parameters of the QCL may be further subdivided or extended to more QCL types, or may be combined into sets. For example, a set 1 is a large-scale spatial characteristic parameter, a set 2 is a large-scale channel gain parameter, a set 3 is large-scale parameters of spatial characteristic, Doppler shift, Doppler spread, average delay, and delay spread, and a set 4 is large-scale parameters of Doppler shift, Doppler spread, average delay, and delay spread. In this case, the information element QuasiCoLocationIndication may be set to q1, q2, q3, and q4, which respectively correspond to the four sets of parameters.

Alternatively, as shown in the foregoing Table 2, channel large-scale characteristic parameters of the QCL may be further subdivided or extended to more QCL types, or may be combined into sets. For example, a set 1 is a large-scale spatial characteristic parameter, a set 2 is a large-scale channel gain parameter, and a set 3 is large-scale parameters of Doppler shift, Doppler spread, average delay, and delay spread. In this case, the information element QuasiCoLocationIndication may be set to q1, q2, and q3, which respectively correspond to the three sets of parameters.

A third optional behavior is:
QuasiCoLocationIndication::=SEQUENCE (SIZE (1, . . . , X)) OF QuasiCoLocationBehavior It indicates that the information element QuasiCoLocationIndication includes a plurality of sets of configurations. There are X sets of parameter configurations in total, and the X sets of parameter configurations form one sequence. One set of configurations corresponds to a QCL behavior assumption configuration between antenna ports that is about a set of QCL parameters.

A fourth optional behavior is:
QuasiCoLocationIndication::=BOOLEAN

For example, corresponding to Table 3, when there are only two sets of parameters, a single bit may be used to indicate a QCL parameter set corresponding to a configured configuration parameter. If the bit is 0, it represents that the configuration parameter is corresponding to a channel large-scale parameter in a set 1, or if the bit is 0, it represents that the configuration parameter is corresponding to a channel large-scale parameter in a set 2.

Alternatively, corresponding to Table 3, the information element may be interpreted as whether a large-scale parameter set including a spatial parameter is configured, and herein, the large-scale parameter set is the set 1 in Table 2. When the information element is set to 0, it indicates that there is no large-scale parameter configuration between antenna ports that is about a spatial parameter; otherwise, it indicates that there is a large-scale parameter configuration between antenna ports that is about a spatial parameter.

Alternatively, as shown in the foregoing Table 2, channel large-scale characteristic parameters of the QCL may be further subdivided or extended to more QCL types, or may be combined into sets. A value of the information element may indicate whether at least one large-scale parameter set including a spatial parameter is configured.

A fifth optional behavior is:
QuasiCoLocationIndication::=BIT STRING (SIZE (X))

A value range of the information element is in a form of a bit table, to form a bit stream. Each bit in a bit stream configured by the information element QuasiCoLocationIndication corresponds to whether a parameter in a corresponding large-scale parameter set is configured.

For example, corresponding to Table 3, the bit stream has two bits. A configuration 1/0 of a first bit corresponds to whether a QCL behavior between antenna ports corresponds to a large-scale parameter of spatial information, and a configuration 1/0 of a second bit corresponds to whether the QCL behavior between the antenna ports corresponds to a large-scale parameter of an average channel gain, a Doppler shift, a Doppler spread, an average delay, and a delay spread.

For example, corresponding to Table 4, the bit stream has six bits. Configurations 1/0 of first to sixth bit locations respectively indicate whether a QCL behavior between antenna ports corresponds to a large-scale characteristic of spatial information, an average channel gain, a Doppler shift, a Doppler spread, an average delay, or a delay spread.

In a possible design, optionally, the applied first set of configuration parameters carry first effective-time indication information, and the first-effective-time indication information is used to notify the terminal device of an effective time of the first set of configuration parameters, so that the terminal device learns of an effective time of quasi co-location of the at least two antenna ports effective when the first type of large-scale characteristic parameter is applied; and/or the applied second set of configuration parameters carry second effective-time indication information, and the second effective-time indication information is used to notify the terminal device of an effective time of the second set of configuration parameters, so that the terminal device learns of an effective time of quasi co-location of the at least two antenna ports effective when the second type of large-scale characteristic parameter is applied.

In a possible design, an effective time is used to indicate a time window in which a set of configuration parameters are effective. Specifically, the effective time may be indicated by using activate/deactivate (active/deactivate) signaling. For example, when a QCL configuration currently is not valid, the configuration is canceled by using deactivate signaling, to reduce signaling overheads of reconfiguring another configuration type.

In a possible design, optionally, the access network device sends first effective-time indication signaling to the terminal device, and the first-effective-time indication signaling is used to notify the terminal device of an effective time of the first set of configuration parameters, so that the terminal device learns of an effective time of quasi co-location of the at least two antenna ports effective when the first type of large-scale characteristic parameter is applied; and/or the access network device sends second effective-time indication signaling to the terminal device, and the second effective-time indication signaling is used to notify the terminal device of an effective time of the second set of configuration parameters, so that the terminal device learns of an effective time of quasi co-location of the at least two antenna ports effective when the second type of large-scale characteristic parameter is applied. In this design, after receiving the QCL configuration information once, the UE reads signaling related to the effective time, and performs, in an indicated time period, a QCL assumption on a corresponding antenna port based on a configuration in the QCL configuration information.

In a possible design, optionally, an implicit effective time of a configuration may be defined in a system. The UE assumes, according to a preset rule, that the effective time is a time from one indication to a next newly generated indication. Once receiving specific configuration information, the UE makes a corresponding QCL assumption based on the current configuration information before a next piece of configuration information arrives.

In a possible design, optionally, the UE assumes that antenna ports that are not effective meet a default QCL relationship, for example, all unindicated large-scale characteristics of all antenna ports without an effectiveness indication are considered as non-QCL. The UE may assume indicated QCL information when receiving related QCL configuration information.

In a possible design, optionally, the first type of channel large-scale characteristic parameter is a parameter that represents a spatial characteristic of a beam, and includes any one of or any combination of the following: a receive angle of arrival (AoA), an angle of arrival spread (AoAS), a transmit angle of departure (AoD), an angle of departure spread (AoDS), and a receive antenna spatial correlation (Receiving Antenna Spatial Correlation).

Specifically, in a possible design, optionally, Table 3 shows a method for designing non-overlapping of large-scale characteristic parameters between quasi co-location types. The method is extended in a QCL definition in 5G, the foregoing large-scale parameter representing spatial information is added, and such spatial information is decoupled from other existing QCL parameters (for example, common channel quality large-scale parameters in LTE: an average channel gain, a Doppler shift, a Doppler spread, an average delay, a delay spread, and so on).

TABLE 3

| QCL type | Channel large-scale characteristic parameter |
| --- | --- |
| 1 | Angle of arrival of a beam or other parameter(s) that represents spatial information of a beam |
| 2 | Average channel gain, Doppler shift, Doppler spread, average delay, and delay spread |

As shown in Table 3, the QCL type 2 may be an existing QCL type in LTE. In the method shown in Table 3, the spatial information is decoupled from another parameter, to indicate a large-scale characteristic of each antenna port.

For example, the QCL type 1 may be configured for an antenna port used for beam management. The antenna port used for beam management may be a separate RS type, or reuse an RS type such as a DMRS. Herein, the antenna port is represented as a BRS. One or more sets of BRS configurations are configured in the type 1, and each configuration may include some or some BRS ports.

With this design, in a 5G system, a channel large-scale characteristic parameter representing spatial information is added to quasi co-location characteristics, and such spatial information and other existing quasi co-location parameters (for example, a delay spread, a Doppler spread, a Doppler shift, an average channel gain, and an average delay in LTE) are decoupled and grouped, to form parameter sets without overlapping QCL types.

The configuration information includes information about at least one signal. The signal may be any one or more of the following: a cell-specific reference signal, a non-zero power CSI-RS, a zero power CSI-RS, a synchronization signal (SS), a DMRS on a PDSCH, a DMRS or the like on a physical broadcasting channel (physical broadcast channel, PBCH), a zero power DMRS, a sounding reference signal SRS, a random access channel PRACH, a DMRS on a PUSCH, a DMRS on a PUCCH, and a tracking reference signal (tracking RS) used for time and/or frequency domain synchronization tracking.

Correspondingly, the signal may be indicated by an antenna port number of an indication signal, a quantity of antenna ports, a pilot pattern, a pilot sequence, a time domain resource location, a frequency domain resource location, a resource identifier, a precoding identifier, or the like. The time domain resource location may be a frame, a subframe, a timeslot, a mini timeslot, an OFDM symbol, or the like.

Optionally, the one or more pieces of configuration information that may be configured in the type 1 may be a QCL relationship between a set of antenna ports that is about a spatial parameter.

The base station may configure the one or more pieces of configuration information in the type 1 by using any one of an RRC message, a MAC layer information element, and downlink control information, and send the configuration information to the terminal device.

Specifically, the configuration by using the RRC message may be performed in any one of the following methods.

In one method, the base station adds the following information to the RRC message and sends the RRC message to the terminal:

QCL information element

Identifier of a CSI-RS signal, for example, a resource ID of the CSI-RS

Identifier of a synchronization signal, for example, a time domain identifier of a resource in which the SS is located Identifier of a DMRS signal, for example, an identifier of an antenna port (group) of the DMRS Identifier of an SRS signal, for example, a resource identifier of the SRS As described above, the RRC message carries a QCL information element. In the information element, the base station indicates a plurality of signals to the UE, for example, the shown CSI-RS, SS, DMRS, and SRS, to indicate that antenna ports corresponding to these signals indicated by the UE pairwise meet a QCL relationship about large-scale parameter spatial information in the type 1.

In another method, the base station performs configuration at the following levels in the RRC message:

Configuration field of a CSI-RS

Identifier of an SS signal and

Configuration field of a DMRS

Identifier of a CSI-RS signal

A meaning of the method is that the base station configures a QCL relationship between a plurality of signal pairs. For example, the CSI-RS and the synchronization signal SS are one signal pair, and the CSI-RS and the DMRS are another signal pair. A QCL relationship of one signal pair may indicate a QCL relationship between the two signals by configuring information about one signal inside the other signal in the signal pair. The UE may learn of, by receiving the configuration, a QCL relationship between an SS block and the CSI-RS, a QCL relationship between the CSI-RS and the DMRS, and the like.

Optionally, the base station may configure a plurality of sets of configurations in the RRC message for the UE, and each set of configurations includes a QCL relationship between the foregoing plurality of signals. A specific configuration may be implemented by using one of the foregoing two methods. The base station activates or triggers one or more sets of configuration information in a MAC information element and/or downlink control information. For example, the base station configures a plurality of sets of configuration information in the RRC message by using the foregoing two methods, and each set of information includes a QCL relationship between a plurality of signals:

Configuration 1: a CSI-RS resource 1, an SS block time index 1, and a DMRS port group 1;

Configuration 2: a CSI-RS resource 2, an SS block time index 2, and a DMRS port group 2;

Configuration 3: a CSI-RS resource 3, an SS block time index 3, and a DMRS port group 3; and Configuration 4: a CSI-RS resource 4, an SS block time index 4, and a DMRS port group 4.

The CSI-RS resources 1 to 4, the SS block time indexes 1 to 4, and the DMRS port groups 1 to 4 are respectively signal identifiers of the CSI-RS, the SS, and the DMRS. The resource identifier, the time domain identifier, and the antenna port group identifier may be alternatively replaced with the foregoing other identifiers.

The base station indicates one set of configurations in the DCI, for example, one of the configurations 1 to 4 in the DCI. Alternatively, the base station indicates a plurality of sets of configurations in the DCI, for example, two of the configurations 1 to 4 in the DCI. For example, the base station instructs to bring the configuration 1 and the configuration 2 into effect. The UE learns that a DMRS antenna port in the DMRS port group 1 is in a QCL relationship with a CSI-RS antenna port of the CSI-RS resource 1 and an SS signal in the SS block time index 1, and that a DMRS antenna port in the DMRS port group 2 is in a QCL relationship with a CSI-RS antenna port of the CSI-RS resource 2 and an SS signal in the SS block time index 2.

The base station obtains, by using at least one of the RRC message, the MAC information element, and the downlink control information, a QCL relationship between a plurality of sets of signals that is about spatial information.

In a possible design, optionally, Table 4 shows a method for designing non-overlapping of large-scale characteristic parameters between quasi co-location types, and parameters in QCL are divided into types of a finer granularity.

TABLE 4

| QCL type | Channel large-scale characteristic parameter |
| --- | --- |
| 1 | Angle of arrival of a beam or other parameter(s) that represents spatial information of a beam |
| 2 | Average channel gain |
| 3 | Doppler shift |
| 4 | Doppler spread |
| 5 | Average delay |
| 6 | Delay spread |

Similar to the foregoing possible design, in this design, one or more pieces of QCL configuration information may be configured for each QCL type, each piece of configuration information includes at least information indicating an antenna port, and the base station notifies each QCL type of a QCL configuration currently used by the UE.

Optionally, the configuration method in the type 1 in Table 2 may also be used for the type 1 in Table 4.

In a possible design, optionally, Table 5 shows a method for designing a large-scale characteristic parameter between quasi co-location types, and the method is a deformed method obtained by splitting and combining classification methods in Table 2, Table 3, and Table 4.

TABLE 5

| QCL type | Channel large-scale characteristic parameter |
| --- | --- |
| 1 | Spatial information |
| 2 | Average channel gain |
| 3 | Doppler shift, Doppler spread, average delay, and delay spread |

Similar to the foregoing possible design, in this design, one or more pieces of QCL configuration information may be configured for each QCL type, each piece of configuration information includes at least information indicating an antenna port, and the base station notifies each QCL type of a QCL configuration currently used by the UE.

The configuration information includes information about at least one signal. The signal may be any one or more of the following: a cell-specific reference signal, a non-zero power CSI-RS, a zero power CSI-RS, a synchronization signal (SS), a DMRS on a PDSCH, a DMRS or the like on a physical broadcasting channel (physical broadcast channel, PBCH), a zero power DMRS, a sounding reference signal SRS, a random access channel PRACH, a DMRS on a PUSCH, a DMRS on a PUCCH, and a tracking reference signal (tracking RS) used for time and/or frequency domain synchronization tracking.

Correspondingly, the signal may be indicated by an antenna port number of an indication signal, a quantity of antenna ports, a pilot pattern, a pilot sequence, a time domain resource location, a frequency domain resource location, a resource identifier, a precoding identifier, or the like. The time domain resource location may be a frame, a subframe, a timeslot, a mini timeslot, an OFDM symbol, or the like.

For a QCL relationship about spatial information in the type 1 and a QCL relationship about a Doppler shift, a Doppler spread, an average delay, and a delay spread in the type 3, the base station configures, in a higher layer RRC message, a QCL configuration of one or more sets of signals.

Optionally, the one or more pieces of configuration information that may be configured in the type 1 may be a QCL relationship between a set of antenna ports that is about a spatial parameter.

The base station may configure the one or more pieces of configuration information in the type 1 by using any one of an RRC message, a MAC layer information element, and downlink control information, and send the configuration information to the terminal device.

Specifically, the configuration by using the RRC message may be performed in any one of the following methods.

In one method, the base station adds the following information to the RRC message and sends the RRC message to the terminal:

QCL information element

Identifier of a CSI-RS signal, for example, a resource ID of the CSI-RS

Identifier of a synchronization signal, for example, a time domain identifier of a resource in which the SS is located Identifier of a DMRS signal, for example, an identifier of an antenna port (group) of the DMRS Identifier of an SRS signal, for example, a resource identifier of the SRS As described above, the RRC message carries a QCL information element. In the information element, the base station indicates a plurality of signals to the UE, for example, the shown CSI-RS, SS, DMRS, and SRS, to indicate that antenna ports corresponding to these signals indicated by the UE pairwise meet a QCL relationship about large-scale parameter spatial information in the type 1.

In another method, the base station performs configuration at the following levels in the RRC message:

Configuration field of a CSI-RS

Identifier of an SS signal and

Configuration field of a DMRS

Identifier of a CSI-RS signal

A meaning of the method is that the base station configures a QCL relationship between a plurality of signal pairs. For example, the CSI-RS and the synchronization signal SS are one signal pair, and the CSI-RS and the DMRS are another signal pair. A QCL relationship of one signal pair may indicate a QCL relationship between the two signals by configuring information about one signal inside the other signal in the signal pair. The UE may learn of, by receiving the configuration, a QCL relationship between an SS block and the CSI-RS, a QCL relationship between the CSI-RS and the DMRS, and the like.

Optionally, the base station may configure a plurality of sets of configurations in the RRC message for the UE, and each set of configurations includes a QCL relationship between the foregoing plurality of signals. A specific configuration may be implemented by using one of the foregoing two methods. The base station activates or triggers one or more sets of configuration information in a MAC information element and/or downlink control information. For example, the base station configures a plurality of sets of configuration information in the RRC message by using the foregoing two methods, and each set of information includes a QCL relationship between a plurality of signals:

Configuration 1: a CSI-RS resource 1, an SS block time index 1, and a DMRS port group 1;

Configuration 2: a CSI-RS resource 2, an SS block time index 2, and a DMRS port group 2;

Configuration 3: a CSI-RS resource 3, an SS block time index 3, and a DMRS port group 3; and Configuration 4: a CSI-RS resource 4, an SS block time index 4, and a DMRS port group 4.

The CSI-RS resources 1 to 4, the SS block time indexes 1 to 4, and the DMRS port groups 1 to 4 are respectively signal identifiers of the CSI-RS, the SS, and the DMRS. The resource identifier, the time domain identifier, and the antenna port group identifier may be alternatively replaced with the foregoing other identifiers.

The base station indicates one set of configurations in the DCI, for example, one of the configurations 1 to 4 in the DCI. Alternatively, the base station indicates a plurality of sets of configurations in the DCI, for example, two of the configurations 1 to 4 in the DCI. For example, the base station instructs to bring the configuration 1 and the configuration 2 into effect. The UE learns that a DMRS antenna port in the DMRS port group 1 is in a QCL relationship with a CSI-RS antenna port of the CSI-RS resource 1 and an SS signal in the SS block time index 1, and that a DMRS antenna port in the DMRS port group 2 is in a QCL relationship with a CSI-RS antenna port of the CSI-RS resource 2 and an SS signal in the SS block time index 2.

The base station obtains, by using at least one of the RRC message, the MAC information element, and the downlink control information, a QCL relationship between a plurality of sets of signals that is about spatial information.

For the type 2, the UE may determine, by using a predefined QCL relationship between antenna ports that is about the channel gain, a QCL relationship between antenna ports that is about the channel gain.

For the type 3, the base station may configure one or more sets of QCL relationships between signals for the UE. The signals include a DMRS, a TRS (tracking RS), a synchronization signal, and the like. The TRS is a reference signal used by the UE for time and frequency synchronization, and the TRS may be a separate TRS, or a CSI-RS with a specific configuration.

For example, the base station may configure the following information in the RRC message:

DMRS port group

TRS ID

This configuration indicates that a DMRS port in a configured DMRS port (group) is in a QCL relationship with a TRS in a configured TRS resource about a Doppler shift, a Doppler spread, an average delay, and a delay spread. In this way, the UE may perform fine time and frequency synchronization based on the TRS, and use the synchronization for PDSCH receiving.

In the method disclosed above, the base station configures, for the UE, one or more sets of QCL relationships between signals about spatial information, and/or one or more sets of QCL relationships between signals about a Doppler shift, a Doppler spread, an average delay, and a delay spread. Specifically, the base station configures one or more sets of configuration information about spatial information QCL for the UE, and configures one or more sets of configuration information about a Doppler shift, a Doppler spread, an average delay, and a delay spread QCL for the UE.

Optionally, the base station may indicate, in a MAC information element and/or downlink control information, a QCL relationship between signals that is used by the UE. Specifically, the base station may separately instruct the UE to apply one or more configurations in one or more sets of configuration information of a QCL relationship about spatial information, and/or instruct the UE to apply one or more configurations in one or more sets of configuration information of a QCL relationship about a Doppler shift, a Doppler spread, an average delay, and a delay spread. Alternatively, specifically, the base station may simultaneously instruct, in a same signaling field, the UE to apply one or more configurations in one or more sets of configuration information of a QCL relationship about spatial information, and/or instruct the UE to apply one or more configurations in one or more sets of configuration information of a QCL relationship about a Doppler shift, a Doppler spread, an average delay, and a delay spread. In other words, the instruction information is sent by using a signaling field in the downlink control information. One signaling field may indicate one or more sets of configurations in one quasi co-location type, or one signaling field may indicate one or more sets of configurations in a plurality of quasi co-location types, or a plurality of signaling fields are used to indicate one or more sets of configurations in a plurality of quasi co-location types.

Still another possible design is shown in Table 6.

TABLE 6

| QCL type | Channel large-scale characteristic parameter |
|---|---|
| 1 | Spatial information |
| 2 | Average channel gain |
| 3 | Doppler shift, Doppler spread, average delay, and delay spread |
| 4 | Spatial information, Doppler shift, Doppler spread, average delay, and delay spread |

For example, such a configuration may be used in Table 6. For a QCL relationship about spatial information in the type 1, a QCL relationship about a Doppler shift, a Doppler spread, an average delay, and a delay spread in the type 3, and a QCL relationship about spatial information, a Doppler shift, a Doppler spread, an average delay, and a delay spread in the type 4, the base station configures, in a higher layer RRC message, a QCL configuration of one or more sets of signals.

The configuration information includes information about at least one signal. The signal may be any one or more of the following: a cell-specific reference signal, a non-zero power CSI-RS, a zero power CSI-RS, a synchronization signal (SS), a DMRS on a PDSCH, a DMRS or the like on a physical broadcasting channel (physical broadcast channel, PBCH), a zero power DMRS, a sounding reference signal SRS, a random access channel PRACH, a DMRS on a PUSCH, a DMRS on a PUCCH, and a tracking reference signal (tracking RS) used for time and/or frequency domain synchronization tracking.

Correspondingly, the signal may be indicated by an antenna port number of an indication signal, a quantity of antenna ports, a pilot pattern, a pilot sequence, a time domain resource location, a frequency domain resource location, a resource identifier, a precoding identifier, or the like. The time domain resource location may be a frame, a subframe, a timeslot, a mini timeslot, an OFDM symbol, or the like.

For the type 1, similarly, the configuration method of the type 1 in Table 5 may be used. For the type 3, similarly, the configuration method of the type 3 in Table 5 may be used.

For the type 4, the base station may configure, in an RRC message, one or more sets of configuration information for the UE. The one set of configuration information may include the foregoing configuration of one or more signals, or include the foregoing configuration of one or more signals and at least one large-scale parameter in the type 4.

In a set of configurations of the type 4, if indications for at least two signals are configured, to indicate a QCL relationship between the at least two signals, there may be two configuration manners. In one manner, the base station configures the indications of the at least two signals in a same signaling field, or the base station configures indications of a plurality of signal pairs pairwise.

Further, the base station configures, in the RRC message, one or more sets of configurations of the type 1, the type 3, and the type 4, and the base station may further instruct, in a MAC information element and/or downlink control information, to apply one or more sets of configurations. Specifically, the base station may separately instruct the UE to apply one or more configurations in one or more sets of configuration information of a QCL relationship about spatial information, and/or instruct the UE to apply one or more configurations in one or more sets of configuration information of a QCL relationship about a Doppler shift, a Doppler spread, an average delay, and a delay spread, and/or instruct the UE to apply one or more configurations in one or more sets of configuration information of a QCL relationship about spatial information, a Doppler shift, a Doppler spread, an average delay, and a delay spread. Alternatively, specifically, the base station may use one signaling field to instruct the UE to apply one or more configurations in one or more sets of configuration information of a QCL relationship about spatial information, and/or instruct the UE to apply one or more configurations in one or more sets of configuration information of a QCL relationship about a Doppler shift, a Doppler spread, an average delay, and a delay spread, and/or instruct the UE to apply one or more configurations in one or more sets of configuration information of a QCL relationship about spatial information, a Doppler shift, a Doppler spread, an average delay, and a delay spread. In other words, the instruction information is sent by using a signaling field in the downlink control information. One signaling field may indicate one or more sets of configurations in one quasi co-location type, or one signaling field may indicate one or more sets of configurations in a plurality of quasi co-location types, or a plurality of signaling fields are used to indicate one or more sets of configurations in a plurality of quasi co-location types.

For a definition of QCL in this embodiment of this application, refer to a definition in LTE. To be specific, signals sent from QCL antenna ports undergo same large-scale fading. The large-scale fading includes one or more of the following: a delay spread, a Doppler spread, a Doppler shift, an average channel gain, an average delay, and the like. For the definition of the QCL in this embodiment of this application, further refer to a definition of QCL in 5G In a New Radio (NR) system, a definition of QCL is similar to that in the LTE system, but spatial information is added. For example, signals sent from QCL antenna ports undergo same large-scale fading, and the large-scale fading includes one or more of the following parameters: a delay spread, a Doppler spread, a Doppler shift, an average channel gain, an average delay, a space domain parameter, and the like. A space domain parameter may be one of the following: an angle of arrival (AOA), a dominant angle of arrival (Dominant AoA), an average angle of arrival (Average AoA), an angle of departure (AOD), a channel-related matrix, a power angle spread spectrum of an angle of arrival, an average angle of departure (Average AoD), a power angle spread spectrum of an angle of departure, transmit channel correlation, receive channel correlation, transmit beamforming, receive beamforming, spatial channel correlation, a filter, a spatial filtering parameter, or a spatial receiving parameter.

However, it should be understood that specific content that is included in the "channel large-scale characteristic parameter" and that is listed in this application is merely an example description, and should not constitute any limitation on the present application. The present application does not exclude a possibility of modifying or extending content included in a "large-scale characteristic" in a future standard. For example, with system evolution in the future, a new characteristic parameter may further be added, on a current basis according to a requirement, to a channel large-scale characteristic parameter that represents spatial information.

When quasi co-location types mentioned in the embodiments of the present application include a type 1 to a type X, the base station sends configuration information of at least one quasi co-location type to the UE. A quantity of quasi co-location types of quasi co-location type configuration information sent by the base station may be Y, where Y is an integer greater than or equal to 1 and less than or equal to X. A value of Y may be indicated to the UE by the base station, or may be determined through predefining. For example, the value of Y may be corresponding to working frequency. A quantity of pieces of indication information of a quasi co-location type is a positive integer that does not exceed Y. A function of the instruction information is to instruct the terminal device to apply a specific set of configuration parameters in at least one set of configuration parameters associated with the quasi co-location type. Therefore, when there is only one set of configuration parameters in the quasi co-location type, the terminal may not be instructed by using the instruction information to apply a specific set of parameters in the quasi co-location type, and the terminal applies, by default, a set of configuration parameters in the quasi co-location type. In the present application, a quantity of sets of configuration parameters indicated by the indication information is not limited, and a quantity of quasi co-location types corresponding to the configuration parameter indicated by the indication information is not limited.

It should be understood that sequence numbers of the foregoing processes do not mean execution sequences in the embodiments of the present application. The execution sequences of the processes should be determined according to functions and internal logic of the processes, and should not be construed as any limitation on the implementation processes of the embodiments of the present application.

The data transmission method for wireless communication in the embodiments of the present application is described above with reference to FIG. 2 to FIG. 4. A data transmission apparatus in the embodiments of the present application is described below with reference to FIG. 5 to FIG. 7.

Figure 5:
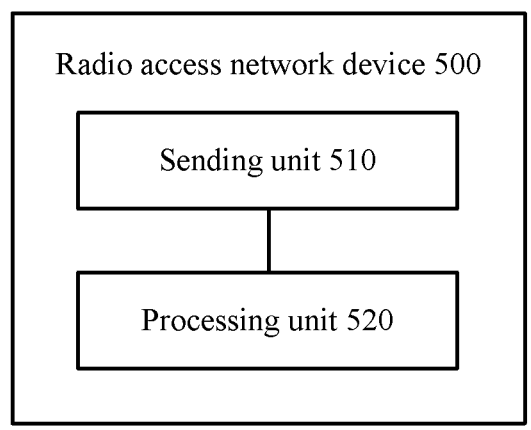
FIG. 5 is a schematic block diagram of a radio access network device according to an embodiment of this application.

This application provides a radio access network device. A schematic block diagram of the radio access network device may be shown in FIG. 5. FIG. 5 is a schematic block diagram of a radio access network device 500 according to an embodiment of this application. As shown in FIG. 5, the access network device 500 includes a sending unit 510 and a processing unit 520.

Specifically, the radio access network device 500 may correspond to a radio access network device that performs various possible designs involved in the data transmission method 200 for wireless communication according to the embodiments of this application. The radio access network device 500 includes corresponding units that may be configured to perform various designs performed by the radio access network device in the method 200 in FIG. 2. In addition, the units in the radio access network device 500 and the foregoing other operations and/or functions are respectively used to implement corresponding procedures and various feasible designs involved in the method 200 in FIG. 2. For brevity, details are not described herein again.

Figure 6:
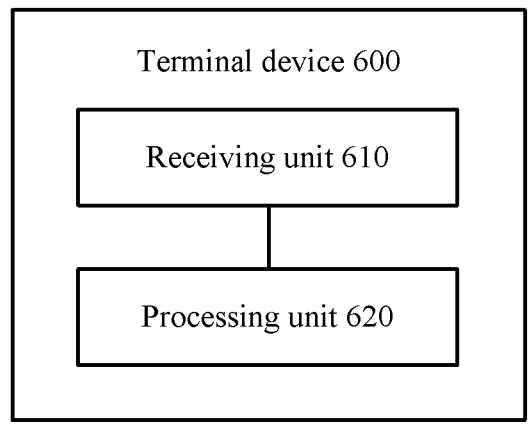
FIG. 6 is a schematic block diagram of a terminal device according to an embodiment of this application.

An embodiment of the present application provides a terminal device. A schematic block diagram of the terminal device may be shown in FIG. 6. FIG. 6 is a schematic block diagram of a terminal device 600 according to an embodiment of the present application. As shown in FIG. 6, the terminal device 600 includes a receiving unit 610 and a processing unit 620.

Specifically, the terminal device 600 may correspond to a terminal device that performs various possible designs involved in the data transmission method 200 for wireless communication according to the embodiments of this application. The terminal device 600 includes corresponding units that may be configured to perform various designs performed by the terminal device in the method 200 in FIG. 2. In addition, the units in the terminal device 600 and the foregoing other operations and/or functions are respectively used to implement corresponding procedures and various feasible designs involved in the method 200 in FIG. 2. For brevity, details are not described herein again.

Figure 7:
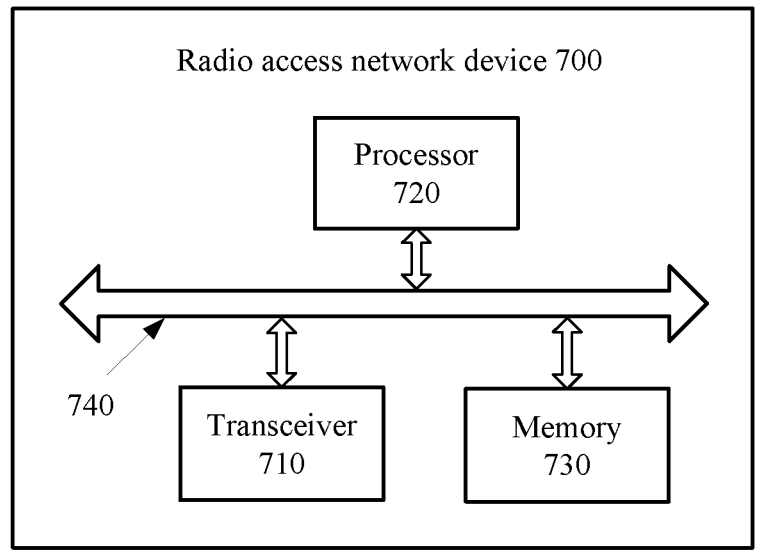
FIG. 7 is a schematic block diagram of a radio access network device according to an embodiment of this application.

This application further provides a radio access network device. A schematic block diagram of the radio access network device may be shown in FIG. 7. FIG. 7 is a schematic block diagram of a radio access network device 700 according to another embodiment of the present application. As shown in FIG. 7, the network device 700 includes a transceiver 710, a processor 720, a memory 730, and a bus system 740. The transceiver 710, the processor 720, and the memory 730 are connected via the bus system 740. The memory 730 is configured to store an instruction. The processor 720 is configured to execute the instruction stored in the memory 730, to control the transceiver 710 to receive and transmit a signal, and to enable the radio access network device 700 to perform the data transmission method 200 and various designs involved in the method 200 in the embodiments of the present application. The memory 730 may be configured in the processor 720, or may be independent of the processor 720.

The following examples are further provided in the embodiments of this application:

Embodiment 1

A data transmission method for wireless communication includes:

sending, by a radio access network device, first signaling to a terminal device, where the first signaling includes a first quasi co-location type, the first quasi co-location type is associated with at least one set of configuration parameters, and the first signaling further includes the at least one set of configuration parameters associated with the first quasi co-location type. The first quasi co-location type is one of at least two preset quasi co-location types, and each of the preset quasi co-location types is associated with at least one channel large-scale characteristic parameter. The first quasi co-location type is associated with a first type of channel large-scale characteristic parameter, and the first type of channel large-scale characteristic parameter includes at least one channel large-scale characteristic parameter. The radio access network device sends the first signaling, so that a first set of configuration parameters in the at least one set of configuration parameters associated with the first quasi co-location type is applied by the terminal device, thereby helping the terminal device learn of at least two quasi co-located antenna ports effective when the at least one channel large-scale characteristic parameter associated with the first quasi co-location type is applied.

Embodiment 2

The data transmission method for wireless communication according to Embodiment 1 includes: sending, by the radio access network device, second signaling to the terminal device, where the second signaling includes a second quasi co-location type, the second quasi co-location type is associated with at least one set of configuration parameters, and the second signaling further includes the at least one set of configuration parameters associated with the second quasi co-location type; where the second quasi co-location type is one of the at least two preset quasi co-location types;

the second quasi co-location type is associated with a second type of channel large-scale characteristic parameter, and the second type of channel large-scale characteristic parameter includes at least one channel large-scale characteristic parameter.

The radio access network device sends the first signaling and the second signaling, so that the first set of configuration parameters and a second set of configuration parameters in the at least one set of configuration parameters associated with the second quasi co-location type are both applied by the terminal device. In this way, the terminal device learns of the at least two quasi co-located antenna ports effective when the first type of channel large-scale characteristic parameter is applied and at least two quasi co-located antenna ports effective when the second type of channel large-scale characteristic parameter is applied.

Embodiment 3

The data transmission method for wireless communication according to either of Embodiment 1 and Embodiment 2 includes:

sending, by the access network device, first instruction information to the terminal device, where the first instruction information is used to instruct the terminal device to apply the first set of configuration parameters in the at least one set of configuration parameters associated with the first quasi co-location type.

Embodiment 4

The data transmission method for wireless communication according to Embodiment 2 includes:

sending, by the access network device, second instruction information to the terminal device, where the second instruction information is used to instruct the terminal device to apply the second set of configuration parameters in the at least one set of configuration parameters associated with the second quasi co-location type.

Embodiment 5

In the data transmission method for wireless communication according to either of Embodiment 3 and Embodiment 4, the first instruction information and the second instruction information are carried in physical layer signaling and sent by the radio access network device to the terminal device.

Embodiment 6

In the data transmission method for wireless communication according to either of Embodiment 3 and Embodiment 4, the first instruction information and the second instruction information are carried in higher layer signaling and sent by the radio access network device to the terminal device.

Embodiment 7

In the data transmission method for wireless communication according to any one of Embodiment 1 to Embodiment 6, the applied first set of configuration parameters carry first effective-time indication information, and the first effective-time indication information is used to notify the terminal device of an effective time of the first set of configuration parameters; and the applied second set of configuration parameters carry second effective-time indication information, and the second effective-time indication information is used to notify the terminal device of an effective time of the second set of configuration parameters.

Embodiment 8

The data transmission method for wireless communication according to any one of Embodiment 1 to Embodiment 6 includes:

sending, by the access network device, first effective-time indication signaling to the terminal device, where the first effective-time indication signaling is used to notify the terminal device of an effective time of the first set of configuration parameters; and sending, by the access network device, second effective-time indication signaling to the terminal device, where the second effective-time indication signaling is used to notify the terminal device of an effective time of the second set of configuration parameters.

Embodiment 9

In the data transmission method for wireless communication according to any one of Embodiment 1 to Embodiment 8, the first type of channel large-scale characteristic parameter is a parameter that represents a spatial characteristic of a beam, and includes any one of or any combination of the following: a receive angle of arrival, an angle of arrival spread, a transmit angle of departure, an angle of departure spread, a receive antenna spatial correlation, and transmit/receive beamforming.

Embodiment 10

A radio access network device includes at least one processor, a transceiver, a memory, and a bus, where the at least one processor, the transceiver, and the memory communicate with each other via the bus; the transceiver is used by the radio access network device to communicate with other devices; the memory is configured to store an instruction; and when the radio access network device runs, the at least one processor executes the instruction stored in the memory, so that the radio access network device performs the method according to any one of Embodiment 1 to Embodiment 9.

Embodiment 11

A data transmission method for wireless communication includes:

receiving, by a terminal device, first signaling from a radio access network device, where the first signaling includes a first quasi co-location type, the first quasi co-location type is associated with at least one set of configuration parameters, and the first signaling further includes the at least one set of configuration parameters associated with the first quasi co-location type; where the first quasi co-location type is one of at least two preset quasi co-location types, and each of the preset quasi co-location types is associated with at least one channel large-scale characteristic parameter; and the first quasi co-location type is associated with a first type of channel large-scale characteristic parameter, and the first type of channel large-scale characteristic parameter includes the at least one channel large-scale characteristic parameter.

The terminal device receives the first signaling, and applies a first set of configuration parameters in the at least one set of configuration parameters associated with the first quasi co-location type, to learn of at least two quasi co-located antenna ports effective when the at least one channel large-scale characteristic parameter associated with the first quasi co-location type is applied.

Embodiment 12

The data transmission method for wireless communication according to Embodiment 11 includes:

receiving, by the terminal device, second signaling from the radio access network device, where the second signaling includes a second quasi co-location type, the second quasi co-location type is associated with at least one set of configuration parameters, and the second signaling further includes the at least one set of configuration parameters associated with the second quasi co-location type; where the second quasi co-location type is one of the at least two preset quasi co-location types;

the second quasi co-location type is associated with a second type of channel large-scale characteristic parameter, and the second type of channel large-scale characteristic parameter includes at least one channel large-scale characteristic parameter.

The terminal device receives the first signaling and the second signaling, applies the first set of configuration parameters and a second set of configuration parameters in the at least one set of configuration parameters associated with the second quasi co-location type, to learn of at least two quasi co-located antenna ports effective when the first type of large-scale characteristic parameter is applied, and at least two quasi-co-located antenna ports effective when the second type of channel large-scale characteristic parameter is applied.

Embodiment 13

In the data transmission method for wireless communication according to either of Embodiment 11 and Embodiment 12, receiving, by the terminal device, first instruction information from the access network device, where the first instruction information is used to instruct the terminal device to apply the first set of configuration parameters in the at least one set of configuration parameters associated with the first quasi co-location type.

Embodiment 14

The data transmission method for wireless communication according to Embodiment 12 includes:

receiving, by the terminal device, second instruction information from the access network device, where the second instruction information is used to instruct the terminal device to apply the second set of configuration parameters in the at least one set of configuration parameters associated with the second quasi co-location type.

Embodiment 15

In the data transmission method for wireless communication according to either of Embodiment 13 and Embodiment 14, the first instruction information and the second instruction information are carried in physical layer signaling and sent by the radio access network device to the terminal device.

Embodiment 16

In the data transmission method for wireless communication according to either of Embodiment 13 and Embodiment 14,
the first instruction information and the second instruction information are carried in higher layer signaling and sent by the radio access network device to the terminal device.

Embodiment 17

In the data transmission method for wireless communication according to any one of Embodiment 11 to Embodiment 16,
the applied first set of configuration parameters carry first effective-time indication information, and the first effective-time indication information is used to notify the terminal device of an effective time of the first set of configuration parameters, so that the terminal device learns of an effective time of quasi co-location of at least two antenna ports effective when the first type of large-scale characteristic parameter is applied; and
the applied second set of configuration parameters carry second effective-time indication information, and the second effective-time indication information is used to notify the terminal device of an effective time of the second set of configuration parameters, so that the terminal device learns of an effective time of quasi co-location of at least two antenna ports effective when the second type of large-scale characteristic parameter is applied.

Embodiment 18

The data transmission method for wireless communication according to any one of Embodiment 11 to Embodiment 16 includes:
receiving, by the terminal device, first effective-time indication signaling from the access network device, where the first effective-time indication signaling is used to notify the terminal device of an effective time of the first set of configuration parameters, so that the terminal device learns of an effective time of quasi co-location of at least two antenna ports; and
receiving, by the terminal device, second effective-time indication signaling from the access network device, where the second effective-time indication signaling is used to notify the terminal device of an effective time of the second set of configuration parameters, so that the terminal device learns of an effective time of quasi co-location of at least two antenna ports effective when the second type of large-scale characteristic parameter is applied.

Embodiment 19

In the data transmission method for wireless communication according to any one of Embodiment 11 to Embodiment 18, the first type of channel large-scale characteristic parameter is a parameter that represents a spatial characteristic of a beam, and includes any one of or any combination of the following: a receive angle of arrival, an angle of arrival spread, a transmit angle of departure, an angle of departure spread, a receive antenna spatial correlation, and transmit/receive beamforming.

Embodiment 20

A terminal device includes at least one processor, a transceiver, a memory, and a bus, where the at least one processor, the transceiver, and the memory communicate with each other via the bus; the transceiver is used by the terminal device to communicate with other devices; the memory is configured to store an instruction; and when the terminal device runs, the at least one processor executes the instruction stored in the memory, so that the terminal device performs the method according to any one of Embodiment 11 to Embodiment 19.

Embodiment 21

A chip system is provided, applied to a radio access network device, where the chip system includes at least one processor, a memory, and an interface circuitry; the interface circuitry is responsible for information exchange between the chip system and the outside; the memory, the interface circuitry, and the at least one processor are interconnected by using lines; the at least one memory stores an instruction; and the instruction is executed by the at least one processor to perform operations of the radio access network device in the method according to any one of Embodiment 1 to Embodiment 9.

Embodiment 22

A chip system is provided, applied to a terminal device, where the chip system includes at least one processor, a memory, and an interface circuitry, where the interface circuitry is responsible for information exchange between the chip system and the outside; the memory, the interface circuitry, and the at least one processor are interconnected by using lines; the at least one memory stores an instruction; and the instruction is executed by the at least one processor to perform operations of the terminal device in the method according to any one of Embodiment 11 to Embodiment 19.

Embodiment 23

A computer readable storage medium is provided, applied to a radio access network device, where the computer readable storage medium stores an instruction, and when the instruction runs on a computing device, operations of the radio access network device in the method according to any one of Embodiment 1 to Embodiment 9 are performed.

Embodiment 24

A computer readable storage medium is provided, applied to a terminal device, where the computer readable storage medium stores an instruction, and when the instruction runs on a computing device, operations of the terminal device in the method according to any one of Embodiment 11 to Embodiment 19 are performed.

Embodiment 25

A communications system includes a radio access network device and/or a terminal device, where
the radio access network device is the radio access network device in Embodiment 10, and the terminal device is the terminal device in Embodiment 20.

Embodiment 26

A computer program product is provided, applied to a radio access network device, where the computer program includes a series of instructions, and when the instructions are run, operations of the radio access network device in the method according to any one of Embodiment 1 to Embodiment 9 are performed.

Embodiment 27

A computer program product is provided, applied to a terminal device, where the computer program includes a series of instructions, and when the instructions are run, operations of the terminal device in the method according to any one of Embodiment 11 to Embodiment 19 are performed.

Specifically, the network device 700 may correspond to a radio access network device that performs the data transmission method 200 and various designs involved in the method 200 according to the embodiments of the present application, and the radio access network device 700 may include entity units configured to perform the method 200 in FIG. 2 and various designs involved in the method 200 that are performed by the radio access network device. In addition, the entity units in the radio access network device 700 and the foregoing other operations and/or functions are respectively used to implement corresponding procedures and designs involved in the method 200 in FIG. 2. For brevity, details are not described herein again.

Figure 8:
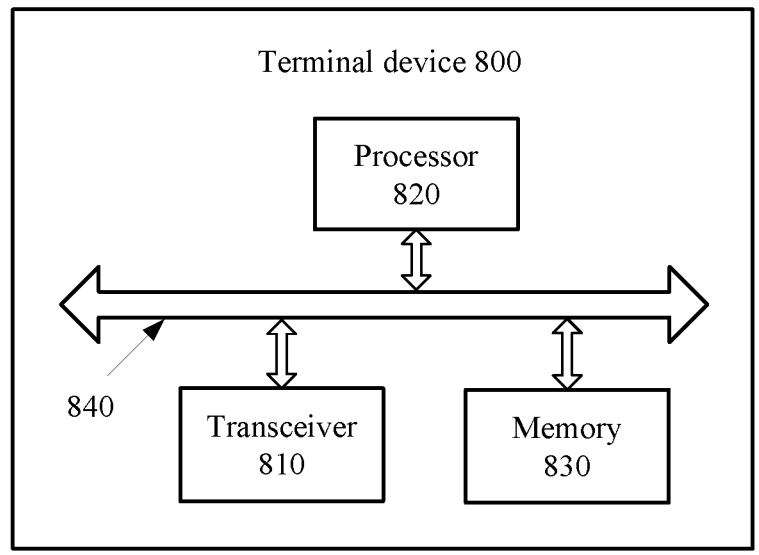
FIG. 8 is a schematic block diagram of a terminal device according to an embodiment of this application.

An embodiment of the present application further provides a terminal device. A schematic block diagram of the terminal device may be shown in FIG. 8. FIG. 8 is a schematic block diagram of a terminal device 800 according to another embodiment of the present application. As shown in FIG. 8, the terminal device 800 includes a transceiver 810, a processor 820, a memory 830, and a bus system 840. The transceiver 810, the processor 820, and the memory 830 are connected via the bus system 840. The memory 830 is configured to store an instruction. The processor 820 is configured to execute the instruction stored in the memory 830, to control the transceiver 810 to receive and transmit a signal, and to enable the terminal device 800 to perform the data transmission method 200 and various designs involved in the method 200 in the embodiments of the present application. The memory 830 may be configured in the processor 820, or may be independent of the processor 820.

Specifically, the terminal device 800 may correspond to a terminal device that performs the data transmission method 200 according to the embodiments of the present application, and the terminal device 800 may include entity units configured to perform the method performed by the terminal device in the method 200 in FIG. 2. In addition, the entity units in the terminal device 800 and the foregoing other operations and/or functions are respectively used to implement corresponding procedures in the method 200 in FIG. 2 or the method 300 in FIG. 3. For brevity, details are not described herein again.

An embodiment of the present application further provides a system chip, applied to a radio access network device. For example, the radio access network device may correspond to the radio access network devices shown in FIG. 5 and FIG. 7 of this application. The system chip includes at least one processor, a communications interface, a memory, and a bus. The at least one processor, the memory, and the communications interface communicate with each other via the bus. The communications interface is used by the system chip to communicate with other devices. The memory is configured to store an instruction. When the system chip runs, the at least one processor executes the instruction stored in the memory, so that the radio access network device performs the data transmission method 200 and various designs involved in the method 200 in the embodiments of the present application.

An embodiment of the present application further provides a system chip, applied to a terminal device. For example, the terminal device may correspond to the terminal devices shown in FIG. 5 and FIG. 7 of this application. The system chip includes at least one processor, a communications interface, a memory, and a bus. The at least one processor, the memory, and the communications interface communicate with each other via the bus. The communications interface is used by the system chip to communicate with other devices. The memory is configured to store an instruction. When the system chip runs, the at least one processor executes the instruction stored in the memory, so that the terminal device performs the data transmission method 200 and various designs involved in the method 200 in the embodiments of the present application.

It should be understood that the processor in the embodiments of the present application may be an integrated circuit chip, and has a signal processing capability. In an implementation process, steps in the foregoing method embodiments can be implemented by using a hardware integrated logical circuit in the processor, or by using instructions in a form of software. The processor may be a central processing unit (CPU), or the processor may be another general purpose processor, a digital signal processor (DSP), an application-specific integrated circuit (Application Specific Integrated Circuit, ASIC), a field-programmable gate array (Field Programmable Gate Array, FPGA) or another programmable logic device, a discrete gate or a transistor logic device, a discrete hardware assembly, or the like. The processor may implement or perform the methods, the steps, and logical block diagrams that are disclosed in the embodiments of the present application. The general purpose processor may be a microprocessor, or the processor may be any conventional processor or the like. Steps of the methods disclosed with reference to the embodiments of the present application may be directly performed and completed by a hardware decoding processor, or may be performed and completed by a combination of hardware and software in the decoding processor. The software may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in the embodiments of the present application may be a volatile memory or a nonvolatile memory, or may include a volatile memory and a nonvolatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), and is used as an external cache. By way of example instead of limitation, RAMs of many forms can be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory of the systems and methods described in this specification is not limited to these and includes any memory of another proper type.

It should further be understood that, the bus system may further include a power bus, a control bus, a status signal bus, and the like, in addition to a data bus. However, for clear description, various types of buses in the figure are marked as the bus system.

In an implementation process, steps in the foregoing methods can be implemented by using a hardware integrated logical circuit in the processor, or by using instructions in a form of software. The steps of the data transmission method disclosed with reference to the embodiments of the present application may be directly performed and completed by a hardware processor, or may be performed and completed by a combination of hardware and software in the processor. The software may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

An embodiment of the present application further provides a computer readable storage medium, the computer readable storage medium stores one or more programs, the one or more programs include an instruction, and when executed by a portable electronic device that includes a plurality of application programs, the instruction enables the portable electronic device to perform the method in the embodiment shown in FIG. 2.

An embodiment of the present application further provides a computer readable storage medium, the computer readable storage medium stores one or more programs, the one or more programs include an instruction, and when executed by a portable electronic device that includes a plurality of application programs, the instruction enables the portable electronic device to perform the method in the embodiment shown in FIG. 3.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely a logical division of functions, and there may be other divisions in actual implementation. For example, a plurality of units or components may be combined or integrated into another system, or some characteristics may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve objectives of solutions of the embodiments.

In addition, functional units in embodiments of the present application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, technical solutions of the present application may be implemented in a form of a software product. The computer software product is stored in a storage medium, and includes several instructions for instructing a computer device (which may be a personal computer, a server, or a network device) to perform all or some of the steps of the methods described in the embodiments of the present application. The foregoing storage medium includes: any medium that can store program code, such as a Universal Serial Bus (USB) flash drive, a removable hard disk, a read-only memory (ROM), a random access memory (RAM), a magnetic disk, or an optical disc.

The foregoing descriptions are merely exemplary implementations of the present application, and are not intended to limit the protection scope of the present application. Any variation or replacement readily figured out by a person skilled in the art within the technical scope disclosed in the present application may fall within the protection scope of the present application.

What is claimed is:

1. A data transmission method for wireless communication, comprising:
receiving, by a terminal device, a first quasi co-location type carried in a first signaling from a radio access network device and a second quasi co-location type carried in a second signaling from the radio access network device, wherein the first quasi co-location type is associated with a first type of channel large-scale characteristic parameter and the second quasi co-location type is associated with a second type of channel large-scale characteristic parameter, and wherein the first type of channel large-scale characteristic parameter comprises at least one channel large-scale characteristic parameter, the second type of channel large-scale characteristic parameter comprises at least one channel large-scale characteristic parameter, and the first type of channel large-scale characteristic parameter is at least partially different from the second type of channel large-scale characteristic parameter, wherein the first signaling further comprises first configuration information, wherein the first configuration information comprises a first channel state information-reference signal (CSI-RS) or synchronization signal (SS), wherein the first quasi co-location type corresponds to the first configuration information, wherein the second signaling further comprises second configuration information, wherein the second configuration information comprises a second CSI-RS or SS, wherein the second quasi co-location type corresponds to the second configuration information, wherein the first type of channel large-scale characteristic parameter represents a spatial characteristic, and wherein the second type of channel large-scale characteristic parameter comprises: a Doppler shift, a Doppler spread, an average delay, and a delay spread;

receiving, by the terminal device, first instruction information from the radio access network device, wherein the first instruction information instructs the terminal device to apply the first configuration information; and applying, by the terminal device, the first type of channel large-scale characteristic parameter and the second type of channel large-scale characteristic parameter.

2. The data transmission method according to claim 1, further comprising:

receiving, by the terminal device, second instruction information from the radio access network device, wherein the second instruction information instructs the terminal device to apply the second configuration information.

3. The data transmission method according to claim 1, wherein the first instruction information is carried in a higher layer signaling sent from the radio access network device.

4. The data transmission method according to claim 1, further comprising:

receiving, by the terminal device, signaling from the radio access network device, wherein the signaling comprises indication information notifying the terminal device of an effective time of the first configuration information.

5. An apparatus, comprising:

a non-transitory memory storing processor-executable instructions; and at least one processor configured to execute the processor-executable instructions to facilitate performance of the following by the apparatus:

receiving a first quasi co-location type carried in a first signaling from a radio access network device and a second quasi co-location type carried in a second signaling from the radio access network device, wherein the first quasi co-location type is associated with a first type of channel large-scale characteristic parameter and the second quasi co-location type is associated with a second type of channel large-scale characteristic parameter, wherein the first type of channel large-scale characteristic parameter comprises at least one channel large-scale characteristic parameter, the second type of channel large-scale characteristic parameter comprises at least one channel large-scale characteristic parameter, and the first type of channel large-scale characteristic parameter is at least partially different from the second type of channel large-scale characteristic parameter, wherein the first signaling further comprises first configuration information, wherein the first configuration information comprises a first channel state information-reference signal (CSI-RS) or synchronization signal (SS), wherein the first quasi co-location type corresponds to the first configuration information, wherein the second signaling further comprises second configuration information, wherein the second configuration information comprises a second CSI-RS or SS, wherein the second quasi co-location type corresponds to the second configuration information, wherein the first type of channel large-scale characteristic parameter represents a spatial characteristic, and wherein the second type of channel large-scale characteristic parameter comprises: a Doppler shift, a Doppler spread, an average delay, and a delay spread;

receiving first instruction information from the radio access network device, wherein the first instruction information is for instructing the apparatus to apply the first configuration information; and applying the first type of channel large-scale characteristic parameter and the second type of channel large-scale characteristic parameter.

6. The apparatus according to claim 5, wherein the at least one processor is further configured to execute the processor-executable instructions to facilitate performance of the following by the apparatus:

receiving second instruction information from the radio access network device, wherein the second instruction information is for instructing the apparatus to apply the second configuration information.

7. The apparatus according to claim 5, wherein the first instruction information is carried in a higher layer signaling sent from the radio access network device.

8. The apparatus according to claim 5, wherein the at least one processor is further configured to execute the processor-executable instructions to facilitate performance of the following by the apparatus:

receiving signaling from the radio access network device, wherein the signaling comprises indication information for notifying the apparatus of an effective time of the first configuration information.

9. A non-transitory computer readable storage medium having instructions stored thereon, wherein the instructions, when executed, facilitate:

receiving, by a terminal device, a first quasi co-location type carried in a first signaling from a radio access network device and a second quasi co-location type carried in a second signaling from the radio access network device, wherein the first quasi co-location type is associated with a first type of channel large-scale characteristic parameter and the second quasi co-location type is associated with a second type of channel large-scale characteristic parameter, wherein the first type of channel large-scale characteristic parameter comprises at least one channel large-scale characteristic parameter, the second type of channel large-scale characteristic parameter comprises at least one channel large-scale characteristic parameter, and the first type of channel large-scale characteristic parameter is at least partially different from the second type of channel large-scale characteristic parameter, wherein the first signaling further comprises first configuration information, wherein the first configuration information comprises a channel state information-reference signal (CSI-RS) or synchronization signal (SS), wherein the first quasi co-location type corresponds to the first configuration information, wherein the second signaling further comprises second configuration information, wherein the second configuration information comprises a second CSI-RS or SS, wherein the second quasi co-location type corresponds to the second configuration information, wherein the first type of channel large-scale characteristic parameter represents a spatial characteristic, and wherein the second type of channel large-scale characteristic parameter comprises: a Doppler shift, a Doppler spread, an average delay, and a delay spread;

receiving, by the terminal device, first instruction information from the radio access network device, wherein the first instruction information is for instructing the terminal device to apply the first configuration information; and applying, by the terminal device, the first type of channel large-scale characteristic parameter and the second type of channel large-scale characteristic parameter.

10. The non-transitory computer readable storage medium according to claim 9, wherein the first instruction information is carried in a higher layer signaling sent from the radio access network device.

11. The non-transitory computer readable storage medium according to claim 9, wherein the instructions, when executed, further facilitate:

receiving second instruction information from the radio access network device, wherein the second instruction information is for instructing the terminal device to apply the second configuration information.

12. The non-transitory computer readable storage medium according to claim 9, wherein the instructions, when executed, further facilitate:

receiving signaling from the radio access network device, wherein the signaling comprises indication information for notifying the terminal device of an effective time of the first configuration information.

13. A data transmission method for wireless communication, comprising:

generating, by a network device, a first quasi co-location type and a second quasi co-location type, wherein the first quasi co-location type is associated with a first type of channel large-scale characteristic parameter and the second quasi co-location type is associated with a second type of channel large-scale characteristic parameter, wherein the first type of channel large-scale characteristic parameter comprises at least one channel large-scale characteristic parameter, the second type of channel large-scale characteristic parameter comprises at least one channel large-scale characteristic parameter, and the first type of channel large-scale characteristic parameter is at least partially different from the second type of channel large-scale characteristic parameter;

sending, by the network device, the first quasi co-location type carried in a first signaling to a terminal device and the second quasi co-location type carried in a second signaling to the terminal device, wherein the first signaling further comprises first configuration information, wherein the first configuration information comprises a first channel state information-reference signal (CSI-RS) or synchronization signal (SS), wherein the first quasi co-location type corresponds to the first configuration information, wherein the second signaling further comprises second configuration information, wherein the second configuration information comprises a second CSI-RS or SS, and wherein the second quasi co-location type corresponds to the second configuration information; and sending, by the network device, first instruction information to the terminal device, wherein the first instruction information instructs the terminal device to apply the first configuration information;

wherein the first type of channel large-scale characteristic parameter represents a spatial characteristic; and wherein the second type of channel large-scale characteristic parameter comprises: a Doppler shift, a Doppler spread, an average delay, and a delay spread.

14. The data transmission method according to claim 13, wherein the first instruction information is carried in a higher layer signaling.

15. The data transmission method according to claim 13, further comprising:

sending, by the network device, second instruction information to the terminal device, wherein the second instruction information instructs the terminal device to apply the second configuration information.

16. The data transmission method according to claim 13, further comprising:

sending, by the network device, signaling to the terminal device, wherein the signaling comprises indication information notifying the terminal device of an effective time of the first configuration information.

17. An apparatus, comprising:

a non-transitory memory storing processor-executable instructions; and at least one processor configured to execute the processor-executable instructions to facilitate performance of the following by the apparatus:

generating a first quasi co-location type and a second quasi co-location type, wherein the first quasi co-location type is associated with a first type of channel large-scale characteristic parameter and the second quasi co-location type is associated with a second type of channel large-scale characteristic parameter, wherein the first type of channel large-scale characteristic parameter comprises at least one channel large-scale characteristic parameter, the second type of channel large-scale characteristic parameter comprises at least one channel large-scale characteristic parameter, and the first type of channel large-scale characteristic parameter is at least partially different from the second type of channel large-scale characteristic parameter;

sending the first quasi co-location type carried in a first signaling to a terminal device and the second quasi co-location type carried in a second signaling to the terminal device, wherein the first signaling further comprises first configuration information, wherein the first configuration information comprises a first channel state information-reference signal (CSI-RS) or synchronization signal (SS), wherein the first quasi co-location type corresponds to the first configuration information, wherein the second signaling further comprises second configuration information, wherein the second configuration information comprises a second CSI-RS or SS, and wherein the second quasi co-location type corresponds to the second configuration information; and sending first instruction information to the terminal device, wherein the first instruction information instructs the terminal device to apply the first configuration information;

wherein the first type of channel large-scale characteristic parameter represents a spatial characteristic; and wherein the second type of channel large-scale characteristic parameter comprises: a Doppler shift, a Doppler spread, an average delay, and a delay spread.

18. The apparatus according to claim 17, wherein the first instruction information is carried in a higher layer signaling.

19. The apparatus according to claim 17, wherein the at least one processor is further configured to execute the processor-executable instructions to facilitate performance of the following by the apparatus:

sending second instruction information to the terminal device, wherein the second instruction information instructs the terminal device to apply the second configuration information.

20. The apparatus according to claim 17, wherein the at least one processor is further configured to execute the processor-executable instructions to facilitate performance of the following by the apparatus:

sending signaling to the terminal device, wherein the signaling comprises indication information notifying the terminal device of an effective time of the first configuration information.

21. A non-transitory computer readable storage medium having instructions stored thereon, wherein the instructions, when executed, facilitate:

generating, by a network device, a first quasi co-location type and a second quasi co-location type, wherein the first quasi co-location type is associated with a first type of channel large-scale characteristic parameter and the second quasi co-location type is associated with a second type of channel large-scale characteristic parameter, wherein the first type of channel large-scale characteristic parameter comprises at least one channel large-scale characteristic parameter, the second type of channel large-scale characteristic parameter comprises at least one channel large-scale characteristic parameter, and the first type of channel large-scale characteristic parameter is at least partially different from the second type of channel large-scale characteristic parameter;

sending, by the network device, the first quasi co-location type carried in a first signaling to a terminal device and the second quasi co-location type carried in a second signaling to the terminal device, wherein the first signaling further comprises first configuration information, wherein the first configuration information comprises a first channel state information-reference signal (CSI-RS) or synchronization signal (SS), wherein the first quasi co-location type corresponds to the first configuration information, wherein the second signaling further comprises second configuration information, wherein the second configuration information comprises a second CSI-RS or SS, and wherein the second quasi co-location type corresponds to the second configuration information; and sending first instruction information to the terminal device, wherein the first instruction information instructs the terminal device to apply the first configuration information;

wherein the first type of channel large-scale characteristic parameter represents a spatial characteristic; and wherein the second type of channel large-scale characteristic parameter comprises: a Doppler shift, a Doppler spread, an average delay, and a delay spread.

22. The non-transitory computer readable storage medium according to claim 21, wherein the first instruction information is carried in a higher layer signaling.

23. The non-transitory computer readable storage medium according to claim 21, wherein the instructions, when executed, further facilitate:

sending second instruction information to the terminal device, wherein the second instruction information instructs the terminal device to apply the second configuration information.

24. The non-transitory computer readable storage medium according to claim 21, wherein the instructions, when executed, further facilitate:

sending signaling to the terminal device, wherein the signaling comprises indication information notifying the terminal device of an effective time of the first configuration information.

* * * * *